(12) United States Patent
Zahir

(10) Patent No.: US 9,815,019 B1
(45) Date of Patent: *Nov. 14, 2017

(54) GAS SEPARATION DEVICE WITH NANOCOMPOSITE MEMBRANE

(71) Applicant: King Fahd University of Petroleum and Minerals, Dhahran (SA)

(72) Inventor: Md. Hasan Zahir, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,225

(22) Filed: Aug. 22, 2017

Related U.S. Application Data

(63) Continuation of application No. 14/920,483, filed on Oct. 22, 2015, now Pat. No. 9,770,688.

(51) Int. Cl.
*B01D 53/22* (2006.01)
*B01D 69/12* (2006.01)
(Continued)

(52) U.S. Cl.
CPC ........... *B01D 53/228* (2013.01); *B01D 69/10* (2013.01); *B01D 69/12* (2013.01); *B01D 71/024* (2013.01);
(Continued)

(58) Field of Classification Search
CPC .... B01D 69/12; B01D 71/024; B01D 53/228; B01D 69/10; B01D 2256/16; B01D 2053/221
See application file for complete search history.

(56) References Cited

U.S. PATENT DOCUMENTS 6,136,966 A    10/2000 Isago
7,001,446 B2 *  2/2006 Roark .................. B01D 53/228
                                             55/524

(Continued)

OTHER PUBLICATIONS

Boffa, V., et al., "Structure and Growth of Polymeric Niobia-Silica Mixed-Oxide Sols for Microporous Molecular Sieving Membranes: A SAXS Study", Chem. Mater., vol. 21, No. 9, pp. 1822-1828, (2009).

*Primary Examiner* — Anthony Shumate
(74) *Attorney, Agent, or Firm* — Oblon, McClelland, Maier & Neustadt, L.L.P.

(57) ABSTRACT

A nanocomposite membrane including $\alpha\text{-Al}_2\text{O}_3$ membrane support, a $\gamma\text{-Al}_2\text{O}_3$ intermediate layer that is 300-1200 nm thick and coats a surface of the membrane support, and a nanocomposite layer including $SiO_2$ and $Y_2O_3$ that is 25-150 nm thick and coats a surface of the intermediate layer, wherein the nanocomposite layer is porous with an average largest radius micropore of 0.2-0.6 nm. A method of manufacturing the nanocomposite membrane, whereby the membrane support is coated with the $\gamma\text{-Al}_2\text{O}_3$, a silica source is hydrolyzed with a mixture of water, an alcohol solvent, and a Y source with a sol-gel technique yield a Si/Y sol-gel, the membrane support is dip coated with the Si/Y sol-gel, and the nanocomposite membrane is calcined. A method of separating a mixture of gas, whereby the mixture of gas is introduced into a permeance cell and fed through the nanocomposite membrane.

10 Claims, 12 Drawing Sheets

(51) Int. Cl.
*B01D 69/10* (2006.01)
*B01D 71/02* (2006.01)

(52) U.S. Cl.
CPC .... *B01D 2053/221* (2013.01); *B01D 2256/16* (2013.01)

(56) References Cited

U.S. PATENT DOCUMENTS

| | | | |
|---|---|---|---|
| 7,553,686 B2 | 6/2009 | George | |
| 7,641,997 B2 | 1/2010 | Hu et al. | |
| 2002/0039648 A1* | 4/2002 | Horpel | B01D 61/362 |
| | | | 428/307.7 |
| 2002/0168785 A1 | 11/2002 | Paz de Araujo | |
| 2003/0090199 A1 | 5/2003 | Saita | |
| 2003/0205698 A1 | 11/2003 | Ogata | |
| 2004/0061433 A1 | 4/2004 | Izuno | |
| 2004/0129135 A1 | 7/2004 | Roark | |
| 2004/0129987 A1 | 7/2004 | Uchiyama | |
| 2005/0122030 A1* | 6/2005 | Sakamoto | H01J 9/02 |
| | | | 313/496 |
| 2005/0183407 A1 | 8/2005 | Hayward | |
| 2006/0077549 A1 | 4/2006 | Kikuchi | |
| 2006/0163605 A1* | 7/2006 | Miyahara | C04B 35/453 |
| | | | 257/103 |
| 2006/0183625 A1* | 8/2006 | Miyahara | C04B 35/053 |
| | | | 501/98.4 |
| 2007/0068382 A1 | 3/2007 | Ku et al. | |
| 2007/0196567 A1 | 8/2007 | Kojima | |
| 2007/0217996 A1 | 9/2007 | Levy | |
| 2007/0241390 A1* | 10/2007 | Tanaka | H01L 27/115 |
| | | | 257/314 |
| 2008/0290393 A1* | 11/2008 | Kakehata | H01L 27/115 |
| | | | 257/316 |
| 2009/0203941 A1 | 8/2009 | Laar | |
| 2009/0214923 A1 | 8/2009 | Takahashi | |
| 2009/0241496 A1* | 10/2009 | Pintault | B01D 67/0048 |
| | | | 55/524 |
| 2009/0286037 A1 | 11/2009 | Tsuchino | |
| 2011/0064936 A1 | 3/2011 | Hammond-Cunningham | |
| 2012/0107707 A1 | 5/2012 | Kubanek | |
| 2013/0189481 A1* | 7/2013 | Grosso | B01D 67/003 |
| | | | 428/118 |
| 2014/0322606 A1 | 10/2014 | Lee | |
| 2015/0194442 A1* | 7/2015 | Ishibashi | H01L 21/76251 |
| | | | 428/137 |
| 2016/0118501 A1 | 4/2016 | Nabatame | |
| 2016/0272644 A1 | 9/2016 | Sojka | |
| 2017/0072370 A1 | 3/2017 | Ehlen | |
| 2017/0093002 A1 | 3/2017 | Choi | |

* cited by examiner

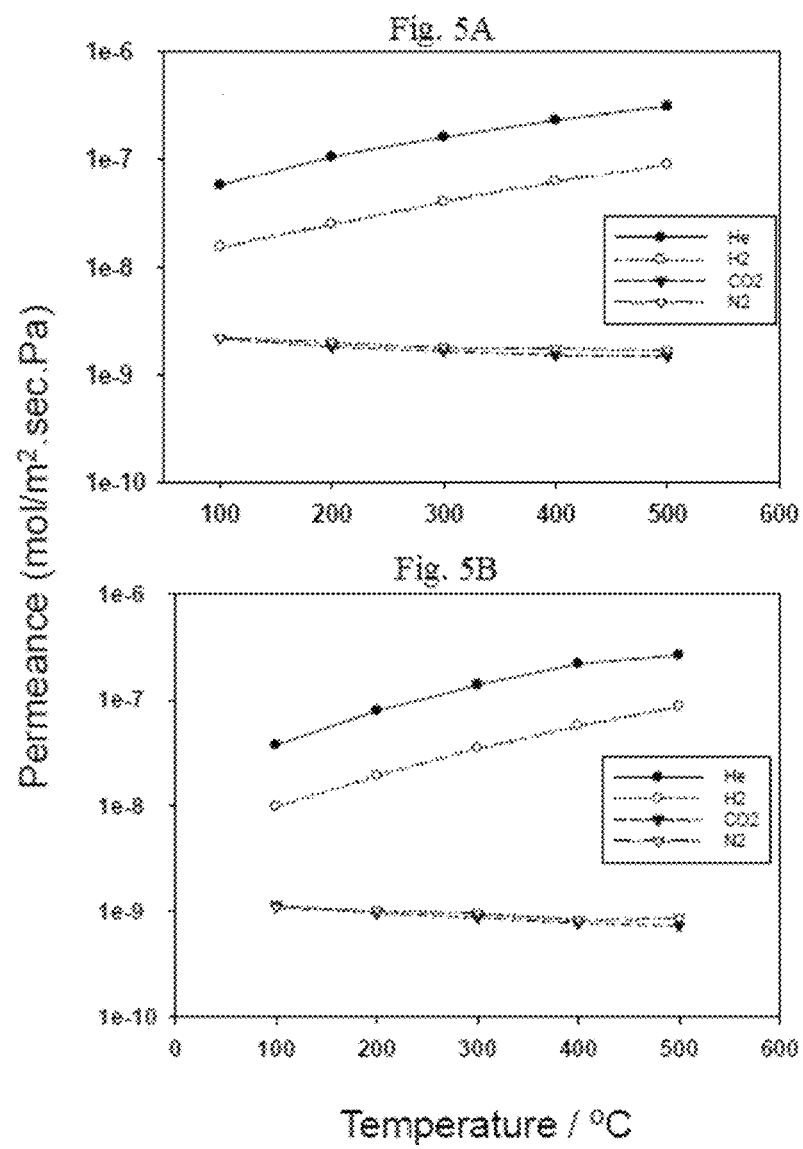

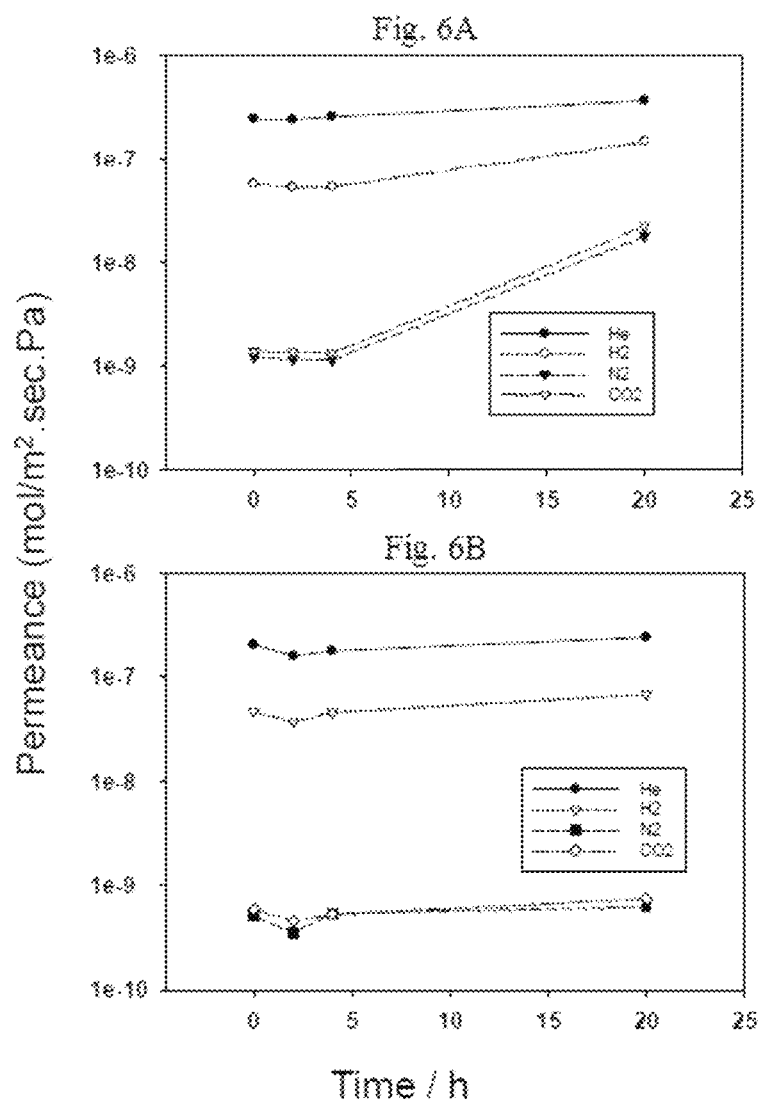

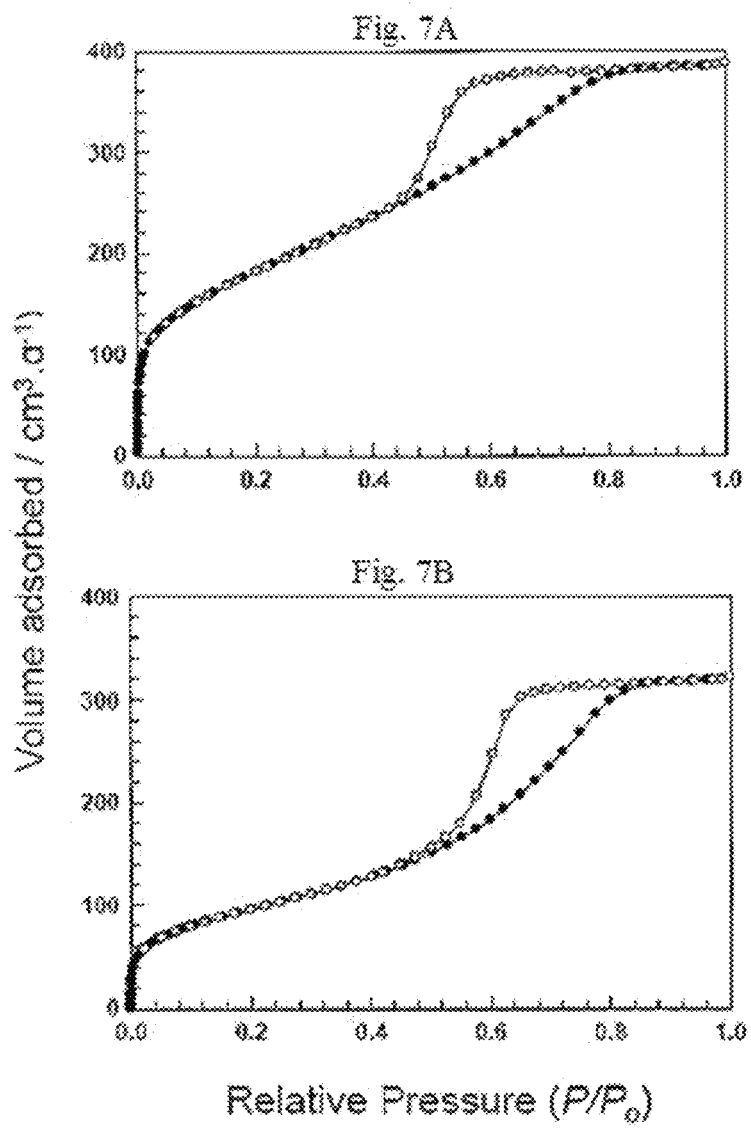

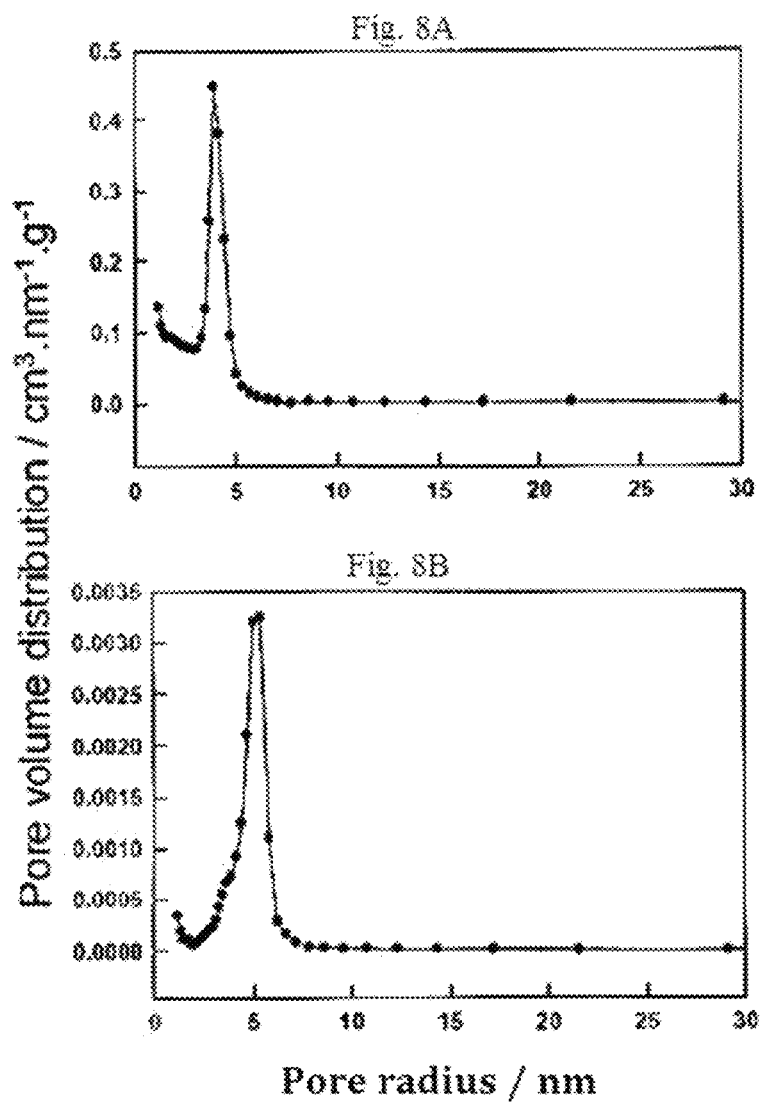

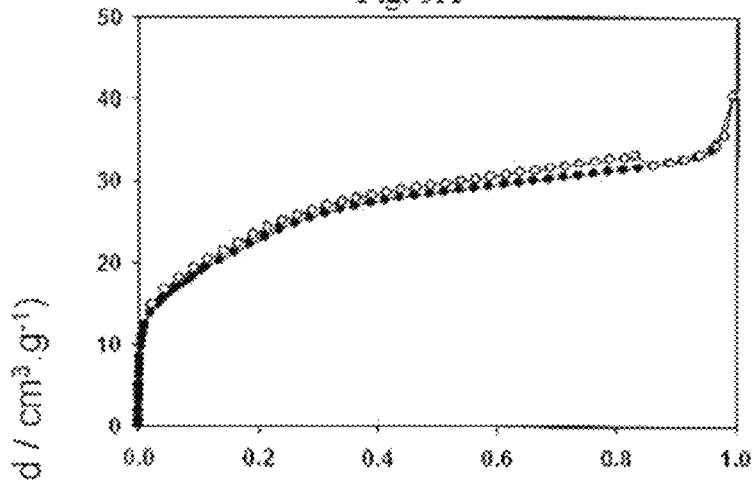
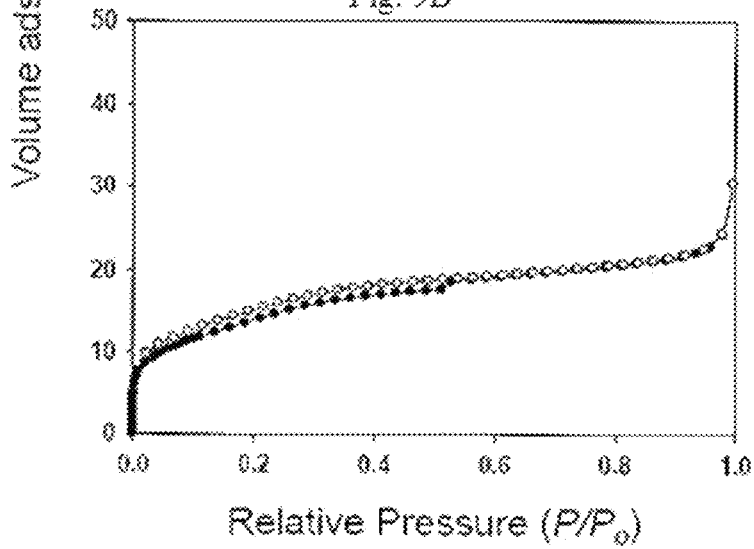

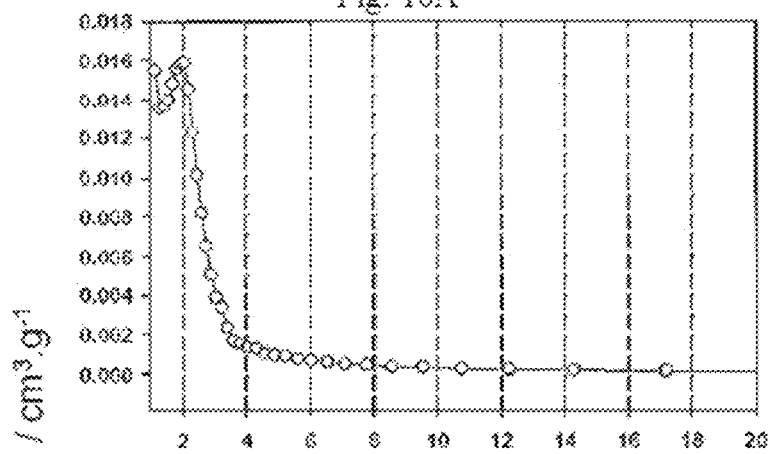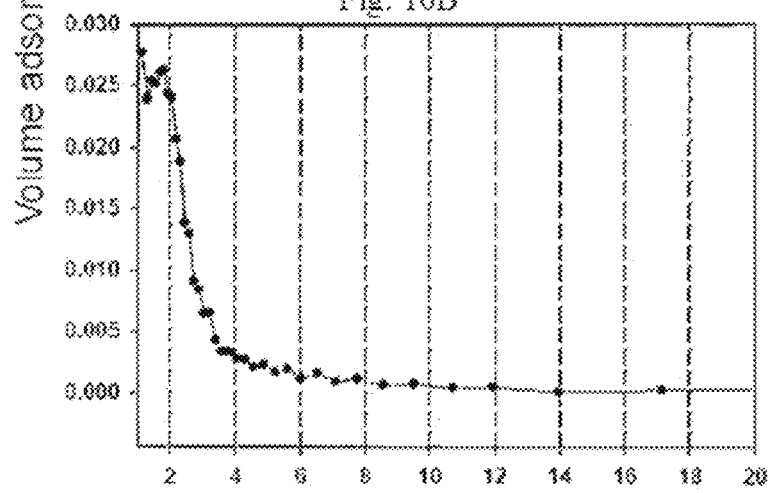

GAS SEPARATION DEVICE WITH NANOCOMPOSITE MEMBRANE

CROSS-REFERENCE TO RELATED APPLICATIONS

The present application is a continuation of Ser. No. 14/920,483, now allowed, having a filing date of Oct. 22, 2015.

BACKGROUND OF THE INVENTION

Technical Field

The present invention relates to a nanocomposite membrane with a Si-Y. nanocomposite layer on an alumina support. The present invention also relates to a dip coating method of making the nanocomposite membrane and a method of separating a mixture of gases with the nanocomposite membrane.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many believe that the world will have a hydrogen based economy in the future. Hydrogen gas combines with oxygen gas to produce water, and in the process releases a substantial quantity of energy:

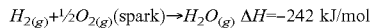

$$H_{2(g)} + \tfrac{1}{2} O_{2(g)}(\text{spark}) \rightarrow H_2O_{(g)} \quad \Delta H = -242 \text{ kJ/mol}$$

Unlike electricity, hydrogen is an advantageous energy source as it can be transmitted by pipelines over long distances and it consumes less energy to transmit than the same amount of energy in the form of electricity. Hydrogen is widely used in various fields of industries, such as chemical, steel, and oil refining and petro-chemical industries. It is also a clean alternative energy source, leading many to predict an increase in hydrogen demand in the near future. Hydrogen is the simplest element and most plentiful gas in the universe. Yet hydrogen never occurs by itself in nature, and always combines with other elements such as oxygen and carbon. Hydrogen can be separated from the mixed gas using one of several adsorption technologies such as pressure swing adsorption (PSA). Due to the higher operation temperature and several complicated purification steps, the cost to produce $H_2$ with these current technologies is too high for it to be an alternative to conventional hydrocarbon fuels. About 50% of world's hydrogen is produced from natural gas $CH_4$ by means of steam-reforming reactions, which are commonly operated at around 800° C. If hydrogen ($H_2$) can be selectively removed from the reforming reactor through a $H_2$-permselective membrane, the thermodynamic equilibrium can be shifted to the product side, resulting in a higher conversion of $CH_4$ to $H_2$ even at lower temperatures (~500° C.). Microporous ceramic membranes with molecular sieve-like properties for gas separation have attracted tremendous attention because of their high durability at elevated temperatures and in severe corrosive environments compared with polymer membranes, See A. J. Burggraaf, "Fundamentals of Inorganic Membrane Science and Technology", Membrane Science and Technology Series, Vol. 4. Elsevier, Amsterdam, (1996), incorporated herein by reference in its entirety.

In particular, start-of the-art microporous silica membranes have been reported to separate hydrogen from other larger gas molecules by a simple molecular sieving effect. The multilayer membrane reactors can be used for methane-reforming reactions for hydrogen production and conversion enhancement its dehydrogenation chemistry, See T. Tsuru, K. Yamaguchi, T. Yoshioka, and M. Asaeda. "Methane Steam Reforming by Microporous Catalytic Membrane Reactors", AIChE J., 50, 2794-805 (2005), incorporated here in by reference in its entirety. The pore diameter and the thickness of the membranes have been successfully controlled via methods including chemical vapor deposition (CVD), sol-gel techniques, and polymer precursor methods, See M. Nomura, H. Aida, S. Gopalakrishnan, T. I. Sugawara, S. Nakao, S. Yamazaki, T. Inada and Y. Iwamoto, "Steam stability of a silica membrane prepared by counter diffusion chemical vapor deposition", Desalination 193, 1-7(2006); R. M. do Vos and H. Verweij, "High-Selectivity, High-Flux Silica Membranes for Gas Separation", Science, 279 1710-1711 (1998); Y. Iwamoto, K. Sato, T. Kato, T. Inada, Y. Kubo, "A hydrogen-permselective amorphous silica membrane derived from polysilazane", J. Euro. Ceram. Soc. 25, 257-264 (2005), each incorporated herein by reference in their entirety. Ultra microporous silica membranes can be synthesized by sol-gel or CVD methods and are cheap to produce. However, there is often a trade-off between permeability and selectivity in both types of membranes, as sol-gel membranes deliver higher fluxes while CVD membranes higher selectivities.

Recently, oxide-based nanoparticle-dispersed amorphous silica membranes have been synthesized and designed also for gas separation applications in industries such as coal gasification, steam methane reforming, water-gas shift reaction and fuel cell systems, See M. Kanezashi and M. Asaeda, "Hydrogen permeation characteristics and stability of Ni-doped silica membranes in steam at high temperature", J. Membr. Sci. 271, 86-93 (2006); L. Barelli, G. Bidini, F. Gallorini, S. Servilli, Hydrogen production through sorption-enhanced steam methane reforming and membrane technology: a review, Energy 33, 554 (2008), each incorporated herein by reference in their entirety. Typically these industries may require gas separation at temperatures preferably between 100° C. and 500° C., which can be met by the employment of silica or metal-based membranes. In the last two decades, gas-separation membranes have been developed using various materials, such as palladium and its alloys, silica and alumina, etc. Palladium membranes formed on porous alumina supports by the electro-less plating techniques and the MOCVD methods were reported to show high $H_2$-permselectivity at 300° C.-500° C., but they have some disadvantages, such as degradation of $H_2$-separation performance, for example, in the presence of hydrocarbons at high temperatures, See E. Kikuchi, Palladium/Ceramic Membranes for Selective Hydrogen Permeation and Their Application to Membrane Reactor, Catal. Today, 25, 333-337 (1995), incorporated herein by reference in its entirety. In order to improve the stability of Pd membranes against the chemical poisoning and mechanical load, Pd alloys (Pd-Ag, Pd-Ni, Pd-Nb) have been employed for metal membranes. In addition to problems with cost, these Pd alloy membranes still have high temperature stability problems, See C.-S. Jun, K.-H. Lee, Palladium and palladium alloy composite membranes prepared by metal-organic chemical vapor deposition method (cold-wall), J. Membr. Sci. 176, 121 (2000), incorporated herein by reference in its entirety.

One of the major concerns with silica-derived membranes relate to their structural integrity and stability for wet gas stream exposure which is generally the case in industrial gas processing. The morphology of silica has been shown to alter upon exposure to steam, mainly directly attributed to the collapse of small pores and expansion of larger pores, resulting in a loss of selectivity, See S. Giessler, L. Jordan, J. C. Diniz da Costa, G. Q. Lu, Performance of hydrophobic and hydrophilic silica membrane reactors for the water gas shift reaction, Sep. Purif. Technol. 32 (1-3), 255 (2003); I. Himai, H. Morimoto, A. Tominaga, H. Hiraschima, Structural changes in sol-gel derived $SiO_2$ and $TiO_2$ films by exposure to water vapour, J. Sol-Gel Sci. Technol., 10, 45, (1997); R. K. Iler, The Chemistry of Silica; Wiley & Sons: New York, (1979), each incorporated herein by reference in their entirety. To address this problem, some research groups have incorporated templates into the silica film whereby the membrane films were calcined in non-oxidizing atmospheres, See G. P. Fotou, Y. S. Lin and S. E. Pratsinis, Hydrothermal stability of pure and modified microporous silica membranes, J. Mater. Sci. 30, 2803-2808(1995), incorporated herein by reference in its entirety. As a result, template silica membranes imparted hydro stable properties, accompanied by structural modifications. For instance, gas selectivity was lowered as covalent ligand methyl template in methyl triethoxysilane led to the formation of slightly larger pore size, See M. Nomura, K. Ono, S. Gopalakrishnan, T. Sugawara, and S.-I. Nakao, Preparation of a Stable Silica Membrane by a Counter Diffusion Chemical Vapor Deposition Method, J. Membr. 251 151-8 (2005), incorporated herein by reference in its entirety. It has been reported that silica membranes prepared by using CVD technique from methyltriethoxyxilane showed high hydrothermal stability with a steam pressure of 75 kPa at 500° C., See M. Nomura, H. Aida, S. Gopalakrishnan, T. Sugawara, S-I. Nakao, S. Yamazaki, T. Inada, Y. Iwamoto, Steam stability of a silica membrane prepared by counter-diffusion chemical vapor deposition, Desalination 193, 1-7 (2006), incorporated herein by reference its entirety. Moreover, it was found that $\gamma$-$Al_2)_3$-doped silica composite membranes can withstand hydrothermal conditions because of the strong network generated by the formation of Si-O-Al linkages, See Y. Gu, P. Harcarlioglu and S. T. Oyama, Hydrothermally stable silica-alumina composite membranes for hydrogen separation, J. Membr. Sci. 310, 28-37(2008), incorporated herein by reference in its entirety. The use of hexyl tri-ethyl ammonium bromide has also improved the hydrothermal stability of membranes when the materials were prepared by sol-gel processes, See M. C. Duke, J. C. Diniz da Costa, G. Q. (Max) Lu, M. Petch, and P. Gray, Carbonised Template Molecular Sieve Silica Membranes in Fuel Processing Systems:Permeation, Hydrostability and Regeneration, J. Membr. Sci., 241, 325-33 (2004), incorporated herein by reference in its entirety. The presence of carbon in the silica matrix can create an hydrophobic surface, which can control the free motion of silanol groups in the silica network at high temperatures and eventually reducing the densification of the silica network, See R. Igi, T. Yoshioka, Y. H. Ikuhara, Y. Iwamoto, and T. Tsuru, Characterization of Co-Doped Silica for Improved Hydrothermal Stability and Application to Hydrogen Separation Membranes at High Temperatures, J. Am. Ceram. Soc., 91, 9, 2975-2981 (2008), incorporated herein by reference in its entirety. In order to improve the stability of silica membranes in steam, inorganic oxides, such as $TiO_2$, $ZrO_2$, $Fe_2O_3$, $Al_2O_3$, NiO, etc. were also tested by doping with silica, See C. H. Chang, R. Gopalan and Y. S. Lin, A Comparative Study on thermal and Hydrothermal Stability of Alumina, Titania and Zirconia Membranes, J. Membrane Sci., 91, 27-45 (1994), incorporated herein by reference in its entirety. Of these metal-doped membranes, Ni-doped silica membranes showed relatively high $H_2$-permence and high stability against water vapor at 35-300° C., suggesting the effectiveness of the addition of nickel oxides to silica for the membrane stability against steam at higher temperatures. Kanezashi and Asaeda found the incorporation of 33% nickel doping to improve hydrothermal stability, See M. Kanezashi and M. Asaeda, "Hydrogen permeation characteristics and stability of Ni-doped silica membranes in steam at high temperature", J. Membr. Sci. 271, 86-93 (2006), incorporated herein by reference in its entirety. However, both hydrogen and nitrogen permeance decreased by 60% and 93%, respectively upon exposure to high temperature water vapor, favoring high $H_2/N_2$ selectivity. Duke et al. reported improved gas selectivity by exposing to steam silica membranes with carbonized templates derived from C6 surfactant triethylhexyl ammonium bromide, See M. C. Duke, J. C. Diniz da Costa, D. D. Do, P. G. Gray, G. Q. Lu, Hydrothermally robust molecular sieve silica for wet gas separation, Adv. Func. Mater, 16 1215-20 (2006), incorporated herein by reference in its entirety. Gu et al. achieved enhanced hydrothermal stability using 3% alumina doping in CVD membranes, however, 45% hydrogen permeance reduction was observed after long-term exposure to steam, See Y. Gu, P. Harcarlioglu and S. T. Oyama, Hydrothermally stable silica-alumina composite membrane for hydrogen separation, J. Membr. Sci. 310, 28-37(2008), incorporated herein by reference in its entirety.

Nanocrystalline $Y_2O_3$ has been mostly investigated for applications in the field of de-NOx catalysts and phosphors for lighting, See M. Fokema and J. Y Ying, The selective catalytic reduction of nitric oxide with methane over scandium oxide, yttrium oxide and lanthanum oxide, Appl. Catal. B. 18, 71-77 (1998); Md. H. Zahir, T. Suzuki, Y. Fujishiro, and M. Awano, Synthesis and characterization of $Sm^{3+}$-doped Y(OH)3 and $Y_2O_3$ nanowires and their NO reduction activity, J. of Alloys and Comp. 476, 335-340 (2009); C. Camas, M. Casu, A. Musinu, G. Piccaluga, A. Speghini and M. Bettinelli, Synthesis, characterization and optical spectroscopy of a Y2O3-SiO2 nanocomposite doped with $Eu^{3+}$, J. Non-Crystalline Solids 306, 193-199 (2002), each incorporated herein by reference in their entirety. The development of $Y_2O_3$ thin films has aroused great interest for their excellent properties such as high dielectric constant, low absorption, chemical stability and excellent thermal conductivity make them adequate for numerous technological applications. Different properties can be observed in rare earth doped films compared with bulk materials, making them interesting to study. Zahir et al. reported that $Y_2O_3$-alone showed quite high and stable catalytic activity for NO reduction at 500° C. in the presence of water vapor, See Md. H. Zahir, T. Suzuki, Y. Fujishiro, and M. Awano, Synthesis and characterization $Sm^{3+}$-doped Y(OH)3 and $Y_2O_3$ nanowires and their NO reduction activity, J. of Alloys and Comp. 476, 335-340 (2009), which is incorporated herein by reference in its entirety. Boffa et al. recently developed a niobia-silica mixed oxide microporous membrane that combines the open percolative pore structure of silica with increased thermal stability, and has a high selectivity for $CO_2$, See V. Boffa, , H. L. Castricum, R. Garcia, R. Schmuhl, A. V. Petukhov, D. H. A. Blank, and J. E. ten Elshof, Structure and Growth of Polymeric Niobia-Silica Mixed-Oxide Sols for Macroporous Molecular Sieving Membranes: A SAXS Study, Chem. Mater., 21 (9), 1822-1828 (2009), incorporated herein by reference in its entirety.

In view of the forgoing, the objective of the present invention is to provide a nanocomposite membrane with a Si-Y nanocomposite layer on an alumina support, a dip coating method of making the nanocomposite membrane, and a method of separating a mixture of gases with the nanocomposite membrane.

BRIEF SUMMARY OF THE INVENTION

According to a first aspect the present disclosure relates to a nanocomposite membrane including i) a membrane support comprising tubular $\alpha$-$Al_2O_3$ ii) an intermediate layer comprising $\gamma$-$Al_2O_3$, wherein the intermediate layer is 300-1200 nm thick and coats a surface of the membrane support iii) a nanocomposite layer comprising $SiO_2$ and $Y_2O_3$, wherein the nanocomposite layer is 25-150 nm thick and coats a surface of the intermediate layer, and wherein the nanocomposite layer is porous with an average largest radius micropore of 0.2-0.6 nm.

In one embodiment, the intermediate layer comprises at least two distinct $\gamma$-$Al_2O_3$ layers, each distinct $\gamma$-$Al_2O_3$ layer being 150-600 nm thick.

In one embodiment, the $Y_2O_3$ is in the form of nanoparticles with a largest dimension of 1-6 nm, the nanocomposite layer is in the form of a $SiO_2$ matrix, and the $Y_2O_3$ nanoparticles are dispersed in or deposited onto the $SiO_2$ matrix.

In one embodiment, the nanocomposite layer is porous with an average mesopore radius of 1-4 nm.

In one embodiment, the molar ratio of Si:Y in the nanocomposite membrane is 1:1 to 5:1.

In one embodiment, the nanocomposite membrane has a membrane permeance of $1e^{-8}$-$1e^{-6}$ mol/m$^2$·sec·Pa for a first gas, and a membrane permeance of $1e^{-10}$-$1e^{-9}$ mol/m$^2$·sec·Pa for a second gas when a mixture of gas comprising the first gas and the second gas is fed through the nanocomposite membrane at a temperature of 100-650° C.

In one embodiment, the first gas is $H_2$, He, or both, and the second gas is $N_2$, $CO_2$, or both.

In one embodiment, the nanocomposite membrane has a membrane permeance of $1e^{-8}$-$1e^{-6}$ mol/m$^2$·sec·Pa for a first gas, and a membrane permeance of $1e^{-10}$-$1e^{-9}$ mol/m$^2$·sec·Pa for a second gas when a mixture of gas comprising the first gas, the second gas, and up to 5 wt % of steam relative to the total weight of the mixture of gas is fed through the nanocomposite membrane.

In one embodiment, the nanocomposite membrane has a permselectivity ranging from 60-400, wherein permselectivity is calculated as the permeance of the first gas divided the permeance of the second gas.

According to a second aspect, the present disclosure relates to a method of manufacturing the nanocomposite membrane, in one or more of its embodiments, by i) coating the membrane support comprising tubular $\alpha$-$Al_2O_3$ with the $\gamma$-$Al_2O_3$ to form a membrane support coated with the intermediate layer ii) hydrolyzing a silica source with a mixture comprising water, an alcohol solvent, and a Y source with a sol-gel technique to yield a Si/Y sol-gel iii) dip coating membrane support coated with the intermediate layer with the Si/Y sol-gel by a dip coating method and iv) calcining in the presence of oxygen at 500-700° C.

In one embodiment, the membrane support is coated at least two times with the $\gamma$-$Al_2O_3$ to form an intermediate layer comprising at least two distinct $\gamma Al_2O_3$ layers, each distinct $\gamma$-$Al_2O_3$ layer being 150-600 nm thick.

In one embodiment, the method further comprises repeating the dip coating and the calcining.

In one embodiment, the molar ratio of the silica source to the Y source is 1.1 to 5:1.

In one embodiment, the silica source is tetraethyl orthosilicate and the Y source is Yttrium(III) nitrate or hydrates thereof.

In one embodiment, the method further comprises adjusting the pH of the mixture to 0.5-4 by adding a mineral acid during the hydrolyzing.

In one embodiment, the calcining is followed by cooling at a cooling rate of 0.1° C./min to 1.5° C./min to form the nanocomposite membrane.

According to a third aspect, the present disclosure relates to a method of separating a mixture of gas comprising a first gas and a second gas involving i) introducing the mixture of gas into a gas feed side of a permeance cell comprising the gas feed side, a permeate side that opposes the gas feed side, and the nanocomposite membrane of the present disclosure, in one or more of its embodiments, wherein the nanocomposite layer of the nanocomposite membrane faces toward the gas feed side and forms a permeable barrier between the gas feed side and permeate side ii) applying a vacuum to the permeate side and iii) separating the first gas from the second gas by allowing the first gas to pass through the nanocomposite membrane and collect in the permeate side, and prohibiting the second gas from passing through the nanocomposite membrane and collect in the gas feed side.

In one embodiment, the first gas has a permeance through the nanocomposite membrane of $1e^{-8}$-$1e^{-6}$ mol/m$^2$·sec·Pa and the second gas has a permeance through the nanocomposite membrane of at $1e^{-10}$-$1e^{-9}$ mol/m$^2$·sec·Pa 100-500° C.

In one embodiment, the first gas is $H_2$, He, or both, and the second gas is $N_2$, $CO_2$, or both.

In one embodiment, a partial pressure of the mixture of gas introduced into the gas feed side is 110-200 kPa.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5A shows temperature dependence of gas permeances ($H_2$, $N_2$, He and $CO_2$) for $SiO_2$.

FIG. 5B shows temperature dependence of gas permeances ($H_2$, $N_2$, He and $CO_2$) for Y-doped $SiO_2$ membranes under dry conditions.

FIG. 6A shows time course of gas permeance through $SiO_2$ (500° C. 150 kPa).

FIG. 6B shows time course of gas permeance through Y-doped silica membranes in steam atmospheres (500° C., 150 kPa).

FIG. 7A shows $N_2$ adsorption/desorption isotherm for $SiO_2$ powder sample before hydrothermal treatment at 500° C. for 4 h.

FIG. 7B shows $N_2$ adsorption/desorption isotherm for $SiO_2$ powder sample after hydrothermal treatment at 500° C. for 4 h.

FIG. 8A shows the BJH pore-size distributions of $SiO_2$ powder sample before hydrothermal treatment at 500° C. for 4 h.

FIG. 8B shows the BJH pore-size distributions of $SiO_2$ powder sample after hydrothermal treatment at 500° C. for 4 h.

FIG. 9A shows $N_2$ adsorption/desorption isotherm for Si/Y (3/1) powder sample before hydrothermal treatment at 500° C. for 4 h.

FIG. 9B shows $N_2$ adsorption/desorption isotherm for Si/Y (3/1) powder sample after hydrothermal treatment at 500° C. for 4 h.

FIG. 10A shows BJH pore-size distributions of Si/Y (3/1) powder sample before hydrothermal treatment at 500° C. for 4 h.

FIG. 10B shows BJH pore-size distributions of Si/Y (3/1) powder sample after hydrothermal treatment at 500° C. for 4 h.

DETAILED DESCRIPTION OF THE EMBODIMENTS

Figure 1:
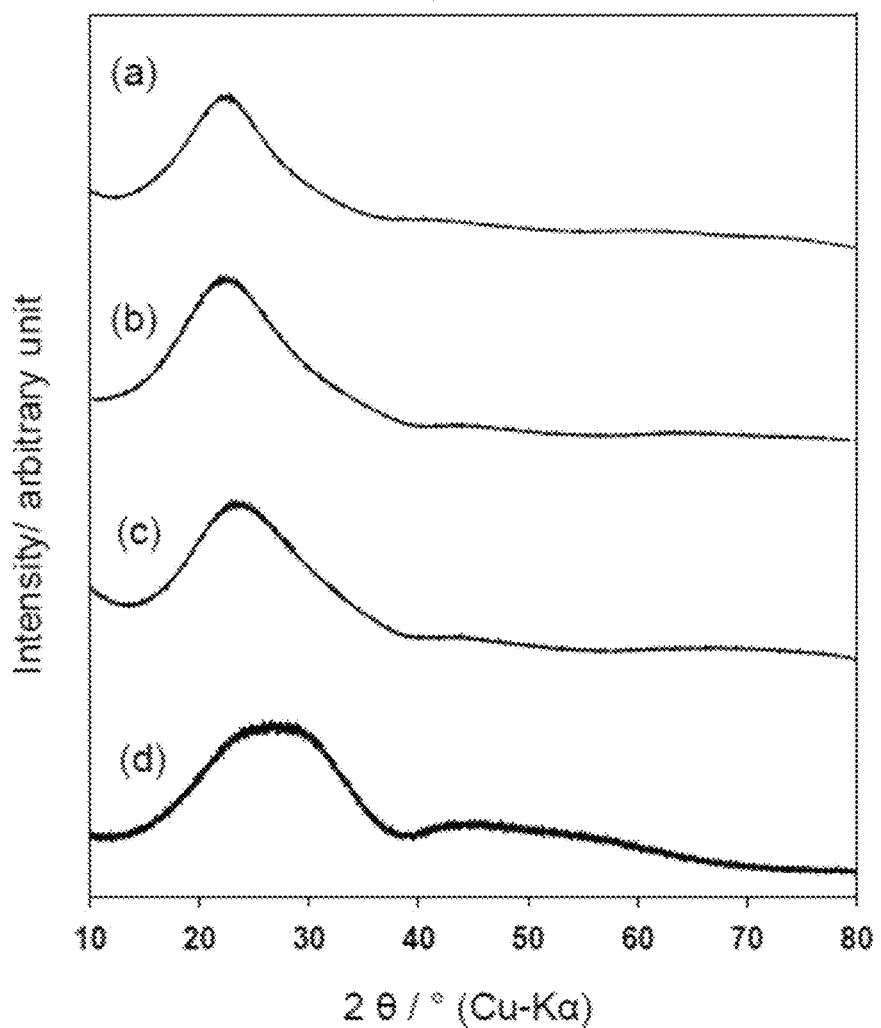
FIG. 1 shows powder X-ray diffraction patterns for the (a) $SiO_2$ sample and the Si—Y—O composites of various Y content (b) Si/Y (2/1), (c) Si/Y (3/1) and (d) Si/Y (4/1) fired at 600° C. in air.

Referring now to the drawings.

According to a first aspect the present disclosure relates to a nanocomposite membrane including a membrane support comprising tubular $\alpha$-$Al_2O_3$. $\alpha$-$Al_2O_3$ is known to have high chemical stability in acid, base and other reactive environments and also has high thermal and hydrothermal stability. High purity $\alpha$-$Al_2O_3$ is used in various inorganic membranes, and is a preferred material from which to make membrane supports. The tubular $\alpha$-$Al_2O_3$ support has no restriction other than it must be macroporous. As used herein, "macroporous" refers to porous materials with largest pore diameters ranging from 50-1000 nm. In one embodiment, the tubular $\alpha$-$Al_2O_3$ support comprises macrospores with diameters ranging from about 50-1000 nm, preferably 60-800 nm, preferably 70-600 nm, preferably 80-400 nm, preferably 90-200 nm, preferably 95-150 nm. The $\alpha$-$Al_2O_3$ membrane support, according to one embodiment, includes a first end, a second end, and an inner channel having surfaces defined by porous walls and extending through the support from the first end to the second end. According to another embodiment, the $\alpha$-alumina membrane support is in the form of a honeycomb monolith. An $\alpha$-$Al_2O_3$ support comprising "an inner channel" includes a support comprising one inner channel as well as a support comprising a plurality of inner channels, such as a plurality of parallel inner channels extending through the support from the first end to the second end. The inner channels may be in the form of capillary structures. Alternatively, the inner channels may be in the form of a non-capillary structure where the channels are formed as a porous labyrinth within a matrix of $\alpha$-$Al_2O_3$ or a bulk structure of $\alpha$-$Al_2O_3$ particles (see for example FIG. 3C).

The tubular $\alpha$-$Al_2O_3$ support may be in the shape of a cylinder with an inner diameter of 4-10 mm, preferably 5-9 mm, more preferably 6-8 mm and an outer diameter of 5-13 mm, preferably 7-12 mm, preferably 9-11 mm, and may have a wall thickness ranging from about 1 mm to about 3 mm. Pall Corporation provides alumina supports its single tube and multi-channel form under the product name Membralox®. The cylindrical shape of the membrane support may be made by a variety of methods, for example an extrusion and sintering process. In one embodiment, the tubular $\alpha$-$Al_2O_3$ support may be in the shape of a disk for placement inside of a permeance cell. In this scenario a macro surface of the $\alpha$-$Al_2O_3$ surface is substantially flat. The tubular $\alpha$-$Al_2O_3$ may have a % porosity of 20-60%, or 25-55%, or 30-50% or 35-45% and the surface area preferably may be in the range of 100-400 $m^2/g$, or 150-350 $m^2/g$, measured by the B.E.T. method. The pore volume of the $\alpha$-$Al_2O_3$ in one embodiment is in the range of 0.5-1.5 ml/g, 0.6-1.3 ml/g, 0.7-1.1 ml/g measured by nitrogen adsorption.

In addition to $\alpha$-$Al_2O_3$, the membrane support may instead be made from materials that are known to be porous or that can be made to be porous. For example, other alumina polymorphs may be used in addition to, or in lieu of $\alpha$-$Al_2O_3$, including $\gamma$-$Al_2O_3$, $\eta$-$Al_2O_3$, $\theta$-$Al_2O_3$, $\chi$-$Al_2O_3$, $\kappa$-$Al_2O_3$, and $\delta$-$Al_2O_3$, or mixtures thereof. Other exemplary non-alumina membrane support materials may include, but are not limited to silica, titania, magnesia, zirconia, zeolites, carbon, phosphorus, gallium, germanium, yttria, niobia, lanthana, stainless steel and combinations thereof. The membrane support preferably comprises at least 90%, 95% or 98% by weight based on the total weight of the membrane support of $\alpha$-$Al_2O_3$. The membrane support preferably consists of $\alpha$-$Al_2O_3$.

The nanocomposite membrane also includes an intermediate layer comprising $\gamma$-$Al_2O_3$, wherein the intermediate layer is 300-1200 nm, preferably 400-1100 nm, more preferably 500-1000 nm, more preferably 600-900 nm, more preferably 650-800 nm thick and coats a surface of the membrane support. The intermediate layer may be obtained from a boehmite sol (i.e. aluminum oxide hydroxide, $\gamma$-AlO(OH) mineral). The intermediate layer may form a thin and defect-free coating of the $\alpha$-$Al_2O_3$ substrate that covers the roughness or bumpy surface of the $\alpha$-$Al_2O_3$ support. In of embodiment, the intermediate layer is distinct from the membrane support, whereby the $\gamma$-$Al_2O_3$ material does not penetrate inside of the $\alpha$-$Al_2O_3$ support. The intermediate layer preferably covers greater than 95%, greater than 96%, greater than 97%, greater than 98%, greater than 99%, greater than 99.5% of the surface of the membrane support.

In this disclosure, "porosity" is an index showing a ratio of void volume with respect to an entire volume of the support or layer. The porosity can be calculated, for example, by taking a photograph of the cross sectional structure, measuring a total void area using the photograph, and calculating the porosity as a ratio of area respect to an entire sectional area of the support or layer of interest in the nanocomposite membrane. Alternatively, the porosity can be measured and/or calculated using $N_2$ adsorption/desorption isotherms (e.g. using Barret-Joyner-Halenda or non-local density functional theory), permporometry methods, and the like.

In a preferred embodiment, the γ-$Al_2O_3$ is mesoporous. As used herein, "mesoporous" refers to porous materials with largest pore diameters ranging from about 2-50 nm. The intermediate layer may comprises mesopores with diameters ranging from about 2-50 nm, preferably 3-45 nm, preferably 4-40 nm, preferably 5-35 nm. The intermediate layer of the present disclosure may have a % porosity of 30-70%, or 35-65%, or 40-65% and a surface area preferably may be in the range of 200-400 $m^2$/g, or 250-395 $m^2$/g, or 300-390 $m^2$/g measured by the B.E.T. method. The pore volume of the intermediate layer comprising γ-$Al_2O_3$ in one embodiment is in the range of 0.3-1.0 ml/g preferably 0.35-0.8 ml/g, more preferably 0.35-0.6 ml/g measured by nitrogen adsorption.

The intermediate layer comprising γ-$Al_2O_3$ can be a single layer or a multilayer. In one embodiment, the intermediate layer comprises at least two distinct γ-$Al_2O_3$ layers, each distinct γ-$Al_2O_3$ layer being 150-600 nm, preferably 200-550 nm, more preferably 250-500 nm, more preferably 300-450 nm, more preferably 325-400 nm thick. When multilayers of γ-$Al_2O_3$ are present, the layers may have decreasing pore sizes. In a preferred embodiment, the pore sizes of the multilayers are substantially similar, but vary in terms of coverage density, wherein the γ-$Al_2O_3$ layers that are separated the furthest from the α-$Al_2O_3$ support have a higher density. For example, if the α-$Al_2O_3$ support is coated a first layer of γ-$Al_2O_3$, by a second layer of γ-$Al_2O_3$ that coats the first layer γ-$Al_2O_3$, the second layer of γ-$Al_2O_3$ is advantageously be more dense than the first layer.

The nanocomposite membrane also includes a nanocomposite layer comprising $SiO_2$ and $Y_2O_3$, wherein the nanocomposite layer is 25-150 nm preferably 50-145 nm, preferably 75-140 nm, preferably 80-135 nm, preferably 85-130 nm, preferably 90-125 nm, preferably 95-120 nm thick and coats a surface of the intermediate layer. In one embodiment the nanocomposite layer is both mesoporous and microporous, and therefore includes a mixture of both mesopores and micropores. The term "microporous" refers to porous materials with largest pore diameters ranging from about 0.2 nm to about 2 nm. In one embodiment, the micropores in the nanocomposite layer have an average largest radius of 0.2-0.6 nm, preferably 0.2-0.5 nm, preferably 0.2-0.4 nm, preferably 0.2-0.3 nm. In one embodiment, the mesopores in the nanocomposite layer have an average mesopore radius of 1-4 nm, preferably 2-4 nm, preferably 3-4 nm. The nanocomposite layer preferably covers greater than 95%, greater than 96%, greater than 97%, greater than 98%, greater than 99%, greater than 99.5% of the surface of the intermediate layer.

The $Y_2O_3$ present in the nanocomposite layer is preferably in the form of a nanomaterial (having a size between 1 and 100 nm). The $Y_2O_3$ nanomaterial may be in the form of various shapes, for example nanoparticles, nanosheets, nanoplatelets, nanocrystals, nanospheres, nanorectangles, nanotriangles, nanopentagons, nanohexagons, nanoprisms, nanodisks, nanocubes, nanowires, nanofibers, nanoribbons, nanorods, nanotubes, nanocylinders, nanogranules, nanowhiskers, nanofibers, nanoflakes, nanofoils, nanopowders, nanoboxes, nanostars, tetrapods, nanobelts, nanourchins, nanoflowers, etc. and mixtures thereof.

In one embodiment, the $Y_2O_3$ is in the form of nanoparticles with a largest dimension of 1-6 nm, preferably 1-5 nm, preferably 1-4 nm, more preferably 2-3 nm. The nanocomposite layer may be in the form of a $SiO_2$ matrix, whereby the $Y_2O_3$ nanoparticles are dispersed in or deposited onto the $SiO_2$ matrix. It is preferable for the $Y_2O_3$ nanoparticles to be insoluble in the $SiO_2$ matrix. Due to the insolubility, these Y-metal ions may compete for non-bridging oxygen in the $SiO_2$ matrix to complete their coordination.

In one embodiment, the molar ratio of Si:Y in the nanocomposite nmembrane is 1:1 to 5:1, preferably 1.5:1 to 4.5:1, preferably 2:1 to 4:1, preferably 2.5:1 to 3.5:1. In a preferred embodiment, the molar ratio of Si:Y in the nanocomposite membrane is about 3:1. The about 3:1 Si:Y ratio is preferred in the nanocomposite membrane because the pore size distribution of the nanocomposite layer is substantially the same before hydrothermal treatment and after hydrothermal treatment involving heating the nanocomposite membrane to at least 600° C., at least 550° C., at least 500° C. for at least 12 hr, at least 14 hr, at least 16 hr, at least 18 hr, at least 20 hr. The hydrothermal treatment may also include the addition of steam, for example about 3 wt % of steam relative to the total weight of a gaseous atmosphere used during the thermal hydrotreatment. In one embodiment, the pore radius (including both micropores and mesopores) in the nanocomposite layer differ by no more than 10%, 9%, 8%, 7%, 6%, 5%, 4%, 3%, 2%, 1% before and after the hydrothermal treatment.

It should be clear to those skilled in the art that oxides of yttrium are not the only materials that can be combined with silica its the nanocomposite layer. Other oxides that can be employed are those of B, Al, P, Ga, Ge, As, In, Sn, Sb, Sc, Ti, V, Zr, Nb, La, Hf, Ce, Dy, Er, Eu, Gd, Nd, Sm, Yb, and Ta, that can form bonds with silica. Similarly, it should be clear to those skilled in the art that the combinations are not restricted to binary combinations, and that multiple component combinations are possible.

In a macro view, the shape of the nanocomposite membrane is not meant to be limiting, and the membrane may be in the form of various shapes, for example, flat (e.g. for a disc-shaped membrane), bent, curved (e.g. a cylinder shaped membrane), rippled, etc. The shape of the membrane may be constructed by forming or shaping the membrane support for a particular application, then coating the membrane support by the methods discussed hereinafter.

As used herein, "permeance" or "membrane permeance" is defined as the degree to which the nanocomposite membrane transmits a gas across the nanocomposite membrane, and is represented by the ratio of gas flux, J (mol/$m^2$s) with a steam pressure of 150 kPa. In one embodiment, the nanocomposite membrane has a membrane permeance of $1e^{-8}$-$1e^{-6}$ mol/$m^2$·sec·Pa, preferably $1e^{-8}$-$8e^{-7}$ mol/$m^2$·sec·Pa, preferably $1e^{-8}$-$6e^{-7}$ mol/$m^2$·sec·Pa, preferably $1e^{-8}$-$4e^{-7}$ mol/$m^2$·sec·Pa, preferably $1e^{-8}$-$3e^{-7}$ mol/$m^2$·sec·Pa for a first gas, and a membrane permeance of $1e^{-10}$-$1e^{-9}$ mol/$m^2$·sec·Pa, preferably $2e^{-8}$-$1e^{-9}$ mol/$m^2$·sec·Pa, preferably $4e^{-10}$-$1e^{-9}$ mol/$m^2$·sec·Pa, preferably $6e^{-10}$-$1e^{-9}$ mol/$m^2$·sec·Pa for a second gas when a mixture of gas comprising the first gas and the second gas is fed through the nanocomposite membrane at a temperature of 100-650° C. The first gas may be $H_2$, He, or both. The second gas may be $N_2$, $CO_2$, or both. For example, under these conditions the nanocomposite membrane has a membrane permeance of $4e^{-8}$-$4e^{-7}$ mol/$m^2$·sec·Pa when the first gas is He, and $1e^{-8}$-$9e^{-8}$ mol/$m^2$·sec·Pa when the first gas is $H_2$. Further in one example, the nanocomposite membrane has a membrane permeance of $5e^{-10}$-$1e^{-9}$ mol/$m^2$·sec·Pa when the second gas is $N_2$, and $5e^{-10}$-$1e^{-9}$ mol/$m^2$·sec·Pa when second gas is $CO_2$. In one embodiment, the membrane permeance of the nanocomposite membrane is determined after first drying the nanocomposite membrane for at least 1 hour, preferably at least 2 hours, more preferably at least 3 hours at a temperature of at least 100° C., preferably least 200° C., more preferably at least 300° C. to remove adsorbed water from the micropores and/or mesopores of the nanocomposite layer.

In one embodiment, the nanocomposite membrane has a membrane permeance of $1e^{-8}$-$1e^{-6}$ mol/m$^2\cdot$sec$\cdot$Pa, preferable $1e^{-8}$-$8e^{-7}$ mol/m$^2\cdot$sec$\cdot$Pa, preferably $1e^{-8}$-$6e^{-7}$ mol/m$^2\cdot$sec$\cdot$Pa, preferably $1e^{-8}$-$4e^{-7}$ mol/m$^2\cdot$sec$\cdot$Pa, preferably $1e^{-8}$-$3e^{-7}$ mol/m$^2\cdot$sec$\cdot$Pa for a first gas, and a membrane permeance of $1e^{-10}$-$1e^{-9}$ mol/m$^2\cdot$sec$\cdot$Pa, preferably $2e^{-10}$-$1e^{-9}$ mol/m$^2\cdot$sec$\cdot$Pa, preferably $4e^{-10}$-$1e^{-9}$ mol/m$^2\cdot$sec$\cdot$Pa , preferably $6e^{-10}$-$1e^{-9}$ mol/m$^2\cdot$sec$\cdot$Pa for a second gas when a mixture of gas comprising the first gas, the second gas, and steam is fed through the nanocomposite membrane. In one embodiment, up to 10 wt %, preferably up to 7 wt %, preferably up to 5 wt %, preferably up 4 wt %, preferably up to 3 wt % of steam is present in the mixture of gas, relative to the total weight of the mixture of gas. For example, under these conditions the nanocomposite membrane has a membrane permeance of $1e^{-7}$-$1e^{-6}$ mol/m$^2\cdot$sec$\cdot$Pa when the first gas is He, and $5e^{-8}$-$9e^{-8}$ mol/m$^2\cdot$sec$\cdot$Pa when the first gas is $H_2$. Further in one example, the nanocomposite membrane has a membrane permeance of $5e^{-10}$-$8e^{-9}$ mol/m$^2\cdot$sec$\cdot$Pa when the second gas is $N_2$, and $5e^{-10}$-$8e^{-9}$ mol/m$^2\cdot$sec$\cdot$Pa when the second gas is $CO_2$.

In one embodiment, the membrane permeance of the nanocomposite membrane changes by less than 5%, preferably less than 4%, preferably less than 3%, preferably less than 2%, preferably less than 1.5%, preferably less than 1% in terms of both the first gas and the second gas in the presence of steam when the permeance is evaluated for up to 25 hours, up to 30 hours, up to 35 hours at temperature of about 500° C. The presence of the $Y_2O_3$ nanoparticles in the nanocomposite layer form a rigid network Si—O—Y atoms, whereby the Y atoms impart stability to the $SiO_2$ matrix and prevent collapsing and/or expanding of the pores (i.e. both micropores and mesopores) present within the nanocomposite layer. This rigidity may provide stable permeance through the nanocomposite membrane of the present disclosure.

In one embodiment, the nanocomposite membrane has a permselectivity ranging from 60-400, or 62-395, or 64-390, or 66-388, or 70-386 wherein the permselectvity is calculated as the permeance of the first gas divided the permeance of the second gas.

According to a second aspect, the present disclosure relates to a method of manufacturing the nanocomposite membrane, in one or more of its embodiments, by coating the membrane support comprising tubular $\alpha$-$Al_2O_3$ with $\gamma$-$Al_2O_3$ to form a membrane support coated with the intermediate layer.

A sol is defined here as collection of suspended particles. The disclosure uses a single dilute sol dipping solution or a series of sol dipping solutions containing sols of the same or different particle sizes. The dipping solutions are used to coat a support. Each coating procedure may be followed by a calcination step. For example, the tubular $\alpha$-$Al_2O_3$ may be coated with the $\gamma$-$Al_2O_3$ using a boehmite (AlOOH) sol ($\gamma$-$Al_2O_3$). Boehmite sols may be prepared by carefully controlling the hydrolysis of aluminum alkoxides (e.g. aluminum isopropoxide). Further acid peptization techniques may also be used to control the particle size of the resulting boehmite precipitate. For example, the following procedure may be used for preparing the membrane support coated with the intermediate layer. A quantity of aluminum isopropoxide is added to distilled water at room temperature. The mixture is heated to 80° C. within 0.5 h with high speed stirring and is maintained at this temperature for 3-24 h for the hydrolysis of the isopropoxide and the formation of a boehmite (AlOOH) precipitate. The precipitate is then heated to 90-95° C. and is peptized using a quantity of acetic acid with molar ratio of acid/aluminum isopropoxide in the range of 0.04-0.15. Peptization refers to the breakup of large oxide precipitate particles by acid treatment. The membrane support coated with the intermediate layer is then prepared by coating the $\alpha$-$Al_2O_3$ support with the $\gamma$-$Al_2O_3$ particles so as to make its external pore structure (in the surface region) more uniform. A single layer of the $\gamma$-$Al_2O_3$ particles may be used of varying or constant size. Alternatively, multiple layers of the $\gamma$-$Al_2O_3$ particles of the same or different size may be used.

In one embodiment, the membrane support is coated at least two times with the $\gamma$-$Al_2O_3$ to form an intermediate layer comprising at least two distinct $\gamma$-$Al_2O_3$ layers, each distinct $\gamma$-$Al_2O_3$ layer being 150-600 nm, preferably 200-550 nm, more preferably 250-500 nm, more preferably 300-450 nm, more preferably 325-400 nm thick.

The method also involves hydrolyzing a silica source with a mixture comprising water, an alcohol solvent, and a Y source with a sol-gel technique to yield a Si/Y sol-gel. In one embodiment, the silica source is tetraethyl orthosilicate (TEOS). The silica source is not restricted to TEOS and may also be tetramethylorthosilicate (TMOS), ethyltriethoxysilane, silane, chlorosilane, and combinations thereof. In one embodiment, the silica source is added to the mixture, which can be performed portion-wise, in one batch, or through any slow addition technique known to those of ordinary skill in the art. The alcohol solvent may include methanol, ethanol, propanol, isopropanol, butanol, and the like, preferably ethanol. Hydrolyzing the silica source may take place for 0.5-24 hours, or 1-20 hours, or 2-16 hours, or 3-12 hours.

In one embodiment, the Y source is yttrium(III) nitrate or hydrates thereof. Although, other sources of Yttrium may be used in the present method, including, but not limited to yttrium fluoride, yttrium chloride, yttrium iodide, yttrium acetate, yttrium trifluoromethanesulfonate, yttrium acetylacetonate, yttrium carbonate, and yttrium trifluoroacetate, and hydrates thereof. In one embodiment, the molar ratio of the silica source to the Y source is 1:1 to 5:1, preferably 1.5:1 to 4.5:1, preferably 2:1 to 4:1, preferably 2.5:1 to 3.5:1.

In one embodiment, the method further comprises adjusting the pH of the mixture to 0.5-4, preferably 0.7-3, preferably 0.9-2, preferably 1.1-1.5, preferably about 1.2 by adding a mineral acid during the hydrolyzing. Exemplary mineral acids include hydrochloric acid, nitric acid, phosphoric acid, sulfuric acid, boric acid, hydrofluoric acid, hydrobromic acid, perchloric acid, hydroiodic acid, and the like. In a preferred embodiment, the mineral acid is nitric acid. After adjusting the pH, hydrolyzing the silica source may be resumed for an additional 0.5-24 hours, or 1-20 hours, or 2-16 hours, or 3-12 hours.

The method also involves dip coating the membrane support coated with the intermediate layer with the Si/Y sol-gel by a dip coating method. The dip-coating method may involve one or more of i) immersing the substrate (e.g. the membrane support coated with the intermediate layer) into the Si/Y sol-gel at a constant speed ii) holding the substrate inside the Si/Y sol-gel for a predetermined amount of time, such as more than 1 second, more than 2 seconds, more than 3 seconds, for than 4 seconds, more than 5 seconds, more than 10 seconds, more than 30 seconds, more than 1 minute, more than 5 minutes to absorb a portion of Si/Y sol onto at least one surface of the substrate (e.g. the membrane support coated with the intermediate layer) iii) withdrawing the substrate coated with the Si/Y sol from the Si/Y sol-gel at a constant speed, wherein the speed determines the thickness of the coating, with faster withdrawal giving thicker coating material) iv) draining excess liquid from the surface of the coated substrate v) evaporating the solvent from the Si/Y sol that coats the substrate, forming the thin layer of the nanocomposite layer. For volatile solvents, such as alcohols, evaporation may begin during the withdrawing and draining steps. In one embodiment, the dip-coating method is performed in continuous fashion, whereby the steps are carried out directly after one another.

The method for manufacturing the nanocomposite membrane then involves calcining in the presence of oxygen at 500-700° C., preferably 525-675° C., preferably 550-650° C., preferably 575-625° C. In one embodiment, prior to the calcining, the Y present in the nanocomposite layer may be fully reduced to the pure metal by a flow of hydrogen at elevated temperature, then the reduced Y may be calcined in air or in the presence of $O_2$ to form the $Y_2O_3$ nanoparticles. In one embodiment, the calcining is followed by cooling at a cooling rate of 0.1° C./min to 1.5° C./min, preferably 0.2° C./min to 1.0° C./min, preferably 0.3° C./min to 0.7° C./min to form the nanocomposite membrane. In one embodiment, the method further comprises repeating the dip coating and the calcining.

According to a third aspect, the present disclosure relates to a method of separating a mixture of gas comprising a first gas and a second gas involving introducing the mixture of gas into a gas feed side of a permeance cell comprising the gas feed side, a permeate side that opposes the gas feed side, and the nanocomposite membrane of the present disclosure, in one or more of its embodiments, wherein the nanocomposite layer of the nanocomposite membrane faces toward the gas feed side and forms a permeable barrier between the gas feed side and permeate side. In one embodiment, the mixture of gas introduced into the gas feed side of the permeance cell has a partial pressure of 110-200 kPa, preferably 120-190 kPa, more preferably 130-180 kPa, even more preferably 140-160 kPa. Alternatively, the partial pressure of the mixture of gas introduced into the gas feed side of the permeance cell is about atmospheric pressure (i.e. about 101.3 kPa). In one embodiment, the method also involves applying a vacuum to the permeate side of the permeance cell. In one embodiment, the mixture of gas is heated to a temperature of 100-500° C., preferably 150-475° C., preferably 200-450° C. for the method of separating. In one embodiment, the first gas is $H_2$, He, or both, and the second gas is $N_2$, $CO_2$, or both.

The permeance cell used for separating the mixture of gas may be any shape so long as the nanocomposite membrane can be secured inside the permeance cell to accomplish the gas mixture separation. For example, the permeance cell may be a cylindrical membrane module. The permeance cell may also include, for example, at least one flow-control valve to control the flow of the mixture of gas introduced into the cell, a vacuum pump or related vacuum-generating device to provide the vacuum to the permeate side, a water source and a plunger pump for introducing water in the form of steam into the permeance cell in addition to the mixture of gas, a constant temperature furnace (e.g. a clamshell furnace, a tube furnace, etc.) for heating the mixture of gas and/or for converting the water source into steam, ferrules (e.g. graphite ferrules) for securing the nanocomposite membrane in place within the permeance cell, gas feed lines, permeate lines, and retentate lines (i.e. lines connected to the gas feed side of the permeance cell) for transporting various gases in and out of the permeance cell, and any other component that is known to those of ordinary skill in the art of permeance cells and gas-gas separations.

The method also involves separating the first gas from the second gas by allowing the first gas to pass through the nanocomposite membrane and collect in the permeate side, and prohibiting the second gas from passing through the nanocomposite membrane and collect in the gas feed side.

In one embodiment, the first gas has a permeance through the nanocomposite membrane of $1e^{-8}$-$1e^{-6}$ mol/m²·sec·Pa, preferably $1e^{-8}$-$8e^{-7}$ mol/m²·sec·Pa, preferably $1e^{-8}$-$6e^{-7}$ mol/m²·sec·Pa, preferably $1e^{-8}$-$4e^{-7}$ mol/m²·sec·Pa, preferably $1e^{-8}$-$3e^{-7}$ mol/m²·sec·Pa and the second gas has a permeance through the nanocomposite membrane of $1e^{-10}$-$1e^{-9}$ mol/m²·sec·Pa, preferably $2e^{-10}$-$1e^{-9}$ mol/m²·sec·Pa, preferably $4e^{-10}$-$1e^{-9}$ mol/m²·sec·Pa, preferably $6e^{-10}$-$1e^{-9}$ mol/m²·sec·Pa at 100-500° C.

In one embodiment, the method further involves exposing the nanocomposite membrane to a steam $N_2$ stream 400-600° C., preferably 420-580° C., more preferably 440-560° C., followed by drying the rear nanocomposite membrane by exposing the nanocomposite membrane to a dry $N_2$ stream at the same temperature prior to the separating. The permeance may then be calculated from an observed pressure difference across the nanocomposite membrane and the permeation rate, which may be obtained using a calibrated critical nozzle placed in between the permeation cell and the vacuum pump or vacuum generating device.

The examples below are intended to further illustrate protocols for preparing, characterizing and using the nanocomposite membrane and are not intended to limit the scope of the claims.

EXAMPLE 1

Experimental

Intermediate Layer (Mesoporous Membrane) Preparation

The complete preparation of γ-$Al_2O_3$ (Intermediate layer) and coating procedure over α-$Al_2O_3$ support is described elsewhere. See Md. H. Zahir, K. Sato, and Y. Iwamoto, "Development of Hydrothermally Stable Sol-Gel Derived La2O3-Doped Ga2O3-Al2O3 Composite Mesoporous Membrane", J. Membr. Sci., 247, 95-101 (2005); Md. H. Zahir, K. Sato, H. Mori, Y. Iwamoto, M. Nomura, and S. Nakao. Preparation and properties of hydrothermally stable-alumina-based composite mesoporous membranes, J. Am. Ceram. Soc. 89, 2874-2780 (2006), each incorporated herein by reference in their entirety. A tubular type support was used for the membrane fabrication.

Synthesis $Y_2O_3$-doped $SiO_2$ Nanocrystalline Precursor by Sol-Gel Method for Top Layer Synthesis composition of the reactants is an important factor in deciding the structure of the final membrane. The changes in reactant parameters can influence the porosity of the gel and the gas permeation behavior of the membrane. Sol-gel synthesis parameters are also important to realize membranes with minimum defects and hence high selectivity. Silica sols were synthesized herein by a single step hydrolysis process as reported by Uhlmann et al. See D. Uhlmann, S. Liu, B. P. Ladewig and J. C. Diniz da Costa, Cobalt-doped silica membranes for gas separation, J. Membr. Sci., 326 316-321 (2009), incorporated herein by reference in its entirely. The degree of hydrolysis and condensation was varied by changing the amount of catalyst, the amount of water used, and by aging the sol at room temperature.

TEOS was hydrolyzed and condensed in an ethanol solution mixed with known amounts of $Y(NO_3)_2·6H_2O$ and water. Y-doped silica sol with a composition of Si/Y ratio (3/1) was prepared as follows. First, 8.34 g of TEOS was added to a mixture of 50 g of ethanol and 11.49 g of $Y(NO_3)_2 \cdot 6H_2O$, followed by hydrolysis and condensation for 12 h. Additional water was added to bring the total weight to 500 g. The pH of the sol solution was adjusted to pH 1.2 by the addition of 2.0 g of $HNO_3$, and the mixture was subjected to another 12 h condensation.

Microporous Membrane (Top Layer) Fabrication

Si/Y colloidal sols were coated on the substrate by dip coating methods and fired for 1 h at 600° C. in air with a healing and cooling rate of 0.5° C./min. The whole process of dipping and calcining is repeated once to repair any defects in the first silica membrane layer. The $SiO_2$ membrane was also fabricated by using the same procedure and these samples are called as-prepared samples.

EXAMPLE 2

Characterization
Powder Preparation for XRD Analysis $Y_2O_3$-doped silica gels were prepared using the quick-drying process. Briefly, Y-doped silica sols were dropped into a Pt dish maintained at 180° C., resulting in gel formation via an instantaneous drying process. Dry gels were fired in air at 600° C. for 1 h. The dry gels were ground in an agate mortar and then analyzed using XRD analysis. XRD patterns were identified using an x-ray diffractometer (Rigaku Denki Co., Tokyo, Japan, RINT-2000V) with a CuKα radiation source of 50 keV and 200 mA with a monochromator over a diffraction angle range 2θ from 10 to 80° at a scan rate of 2°/min. Nitrogen adsorption and desorption experiments were conducted using the Quantachrome Autosorb-IC automated gas sorption system (Quantachrome Instruments Co., Boyntrm Beach, Fla.). Before the measurements, the samples were first degassed at 350° C. for 3 h under vacuum. The pore-size distribution measurements were conducted directly on the membrane by nano-permporometer (Seika, Japan).

Hydrothermal Treatment at 500° C.

To understand the hydrothermal stability of the CZA system, the as-prepared samples were exposed to steam using a Teflon-lined stainless-steel autoclave, maintaining 3 vol % wet (steam) gas streams were fed to the heated module at 500° C. All samples were heat treated at 500° C. because the multilayered-membrane reactor system could be operated at 500° C.5 Steam was generated from a water reservoir kept at 80° C.

Measurements of Gas Permeance Under Dry and Wet Conditions

Membrane gas permeance was performed in the temperature range of 100-500° C. Prior to the permeance measurements the membranes were dried for 3 hours at 300° C. to remove adsorbed water from the micropores. Multilayer tubular support was placed in stainless-steel permeance cells with the micropores top-layer at the feed side. The permeance is defined as ratio of the gas flux, J $(mol/m^2 s)$ with steam pressure of 150 kPa.

Hydrothermal stability tests of the membranes were performed observing gas permeance changes for temperatures ranging from 100°-500° C. A mixture of gas was fed on the outside (upstream) of a cylindrical membrane module under atmospheric pressure, while the permeate side (downstream) was evacuated by a vacuum pump. The feed gas flow rate was controlled by a flow control-valve before introducing water from a plunger pump. And the feed was preheated in a constant temperature furnace before fed to the test section through a thin bed of glass beads. The partial pressure of $H_2O$ in the feed gas stream was kept at 150 kPa. After exposing the membrane to the steamed $N_2$ stream at 500° C. for specified time intervals, the membrane was dried completely in a pure $N_2$ stream at the same temperature before observing single gas permeance ($N_2$, $H_2$, He). The permeance was calculated from the observed pressure difference across the membrane and the permeation rate, which was obtained by a calibrated critical nozzle placed between the permeation cell and the vacuum pump. After specified time intervals of hydrothermal stability tests, the temperature dependency of single gas permeance ($N_2$, $H_2$, He and $CO_2$) was observed in a temperature range 300°-500° C. More than five measurements were made and the average value was recorded.

EXAMPLE 3

Results & Discussion
Effect of Y-Doping into Silica

It has been reported that the rare-earths (RE) ions in silicate probably enter as network modifiers due to the poor solubility of RE into the silica matrix. Due to insolubility, these metal ions compete for non-bridging oxygen in order to complete their coordination. Very recently, a limited number of research works has been published on high quality metal-doped silica membranes. This includes doping the silica matrix with nickel and cobalt. In all cases the metal oxide in the silica matrices of the membranes were chemically reduced to pure metal by a flow of hydrogen at elevated temperature, particularly in the case of Ni-doped silica. Formation of nanocrystalline RE silicates (RE=Y) inside or at the surface of amorphous $SiO_2$ matrix could be possible upon heat treatment in air. FIG. 1 shows XRD spectra of $SiO_2$ and Y-doped $SiO_2$ powder samples calcined at 600° C. in air for 1 h. They are typical of amorphous materials and are very similar to the pattern of amorphous silica. No peculiar evolution was observed after heat treatment up to 600° C. X-ray diffraction patterns of $SiO_2$ and Y-doped $SiO_2$ are similar and all spectra have only one dispersive broad peak, which indicates that all samples are non-crystalline solids. The heat treatment of samples in air using a furnace at 600° C. for 1 h has minimal effect on the structure of un-doped and doped silica. However, the broad peak was shifted slightly to the higher diffraction angle when the Si/Y was (1/4). The peak intensity of Si/Y (3/1) was less than that of the un-doped $SiO_2$. This result also suggested that Y-doped into $SiO_2$ existed as like noncrystalline compounds, such as extremely fine particles that are undetectable by XRD or as Y composites with $SiO_2$. Since there is no evolution either of the Y-based nanoparticles or of the $SiO_2$ after heat treatment at 600° C. Therefore, we have decided to fully investigate only the sample heated at 600° C., which is characterized by a lower amount of the defects typical of sol-gel silica.

Selection of the Optimum Concentration of Y

Initially, we have synthesized $SiO_2$ and Y-doped $SiO_2$ powders samples of various Y contents (Si/Y=4/1, 3/1 and 2/1) by sol-gel techniques. Although it has been reported that the adsorption isotherm of the silica gel produced a bi-modal pore size distribution according to the Horvath-kawazoe (H-K) analysis, See G. Horváth, K. Kawazoe, Method for the calculation of effective pore size distribution in molecular sieve carbon, J. Chem. Eng. Jpn. 16, 470-475 (1983), incorporated herein by reference in its entirety. However, such a distribution for the $SiO_2$ sample was not observed.

The detail pore size distribution under dry and wet conditions are given in the following section. In the case of Si/Y (2/1) sample had a bimodal pore size distribution with pore diameter ca. 5 nm. Moreover, the pore volume was decreased after hydrothermal treatment of Si/Y (2/1). A sharp peak was observed with narrow pore size distribution for the Si/Y (4/1). The pore volume was also decreased after hydrothermal treatment of Si/Y (4/1) sample. In the case of Si/Y (3/1), the pore size distribution was unchanged before and after hydrothermal treatment. Therefore, the remaining data were collected by Si/Y (3/1) sample. The $SiO_2$ sample was tested for the purpose of comparison.

Thermal Analysis

Figure 2:
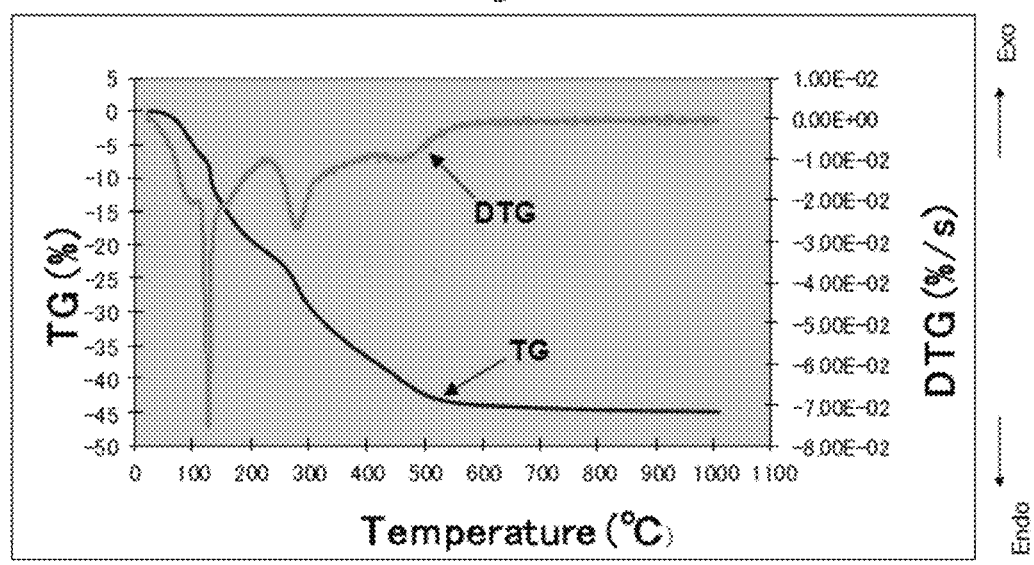
FIG. 2 is a graph of TGA showing relative weight loss vs. T for Si/Y (3/1) as-prepared sample.

TG curve of Si/Y (3/1) powder sample is shown in FIG. 2. The mass loss which takes place below 100° C. is probably due to the physical desorption of water and the evaporation of Si/Y nanocomposite. From the TG-DTA curves, it has been observed that four major weight losses for this nanocomposite. Abrupt decomposition was not observed in this case. The huge loss of weight was located in between 200° and 480° C. After this, further weight loss of 7.09% was found to be up to temperature 500° C. Overall there was a total weight loss of 45 wt % when Si/Y gels were heated from room temperature to 550° C. Therefore, all the samples were calcined at 600° C. for 1 h in air. A dehydrates at ca. 90° C., successively loses organic molecules by two steps in the temperature range of 97-350° C., with a sharp exothermic peak. The sharpest exothermic peak is located in between 120 and 125° C., Another exothermic peak was observed at around 290° C. A weak exothermic peak in the last step of the decomposition was close to 500° C. The possible processes that take place as the temperature increases are elimination of physically adsorbed water and ethanol, oxidation of residual organics, relaxation of the silica skeleton, condensation of adjacent hydroxyls and segregated hydroxyls, and viscous sintering, in that order.

Membrane Characterization

Figure 3:
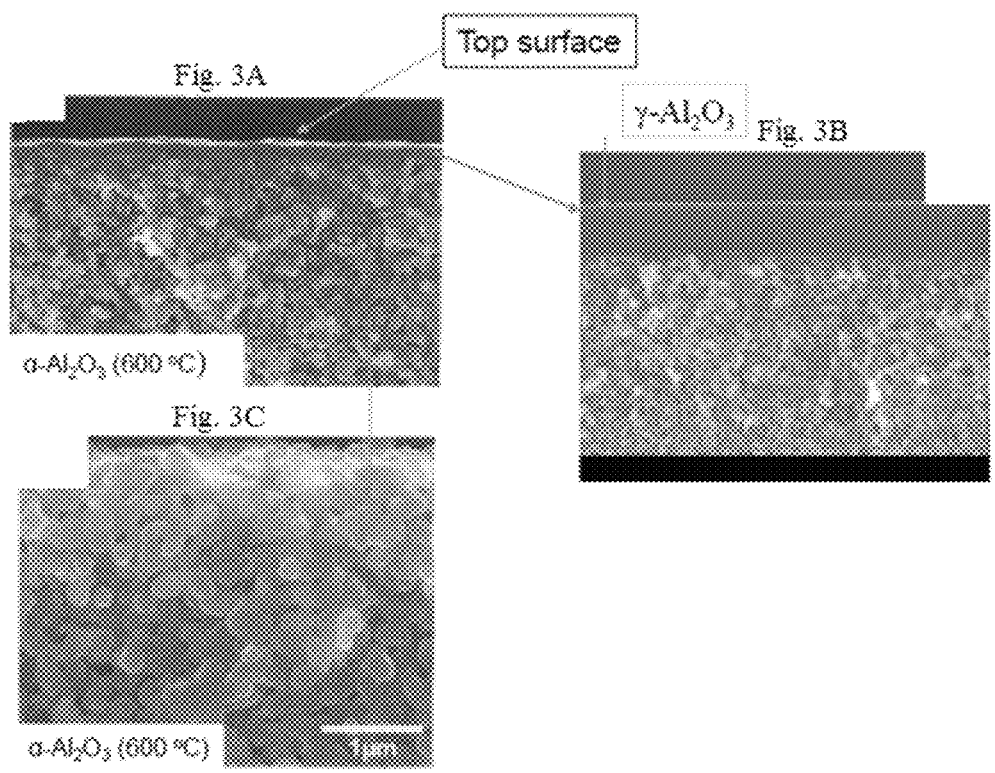
FIG. 3A is a SEM image of a cross-section of Y-doped $SiO_2$ membrane Si/Y (3/1).
FIG. 3B is a SEM image of a cross-section $\gamma$-$Al_2O_3$ and its thickness.
FIG. 3C is an enlarged SEM image of $\alpha$-$Al_2O_3$.
Figure 4:
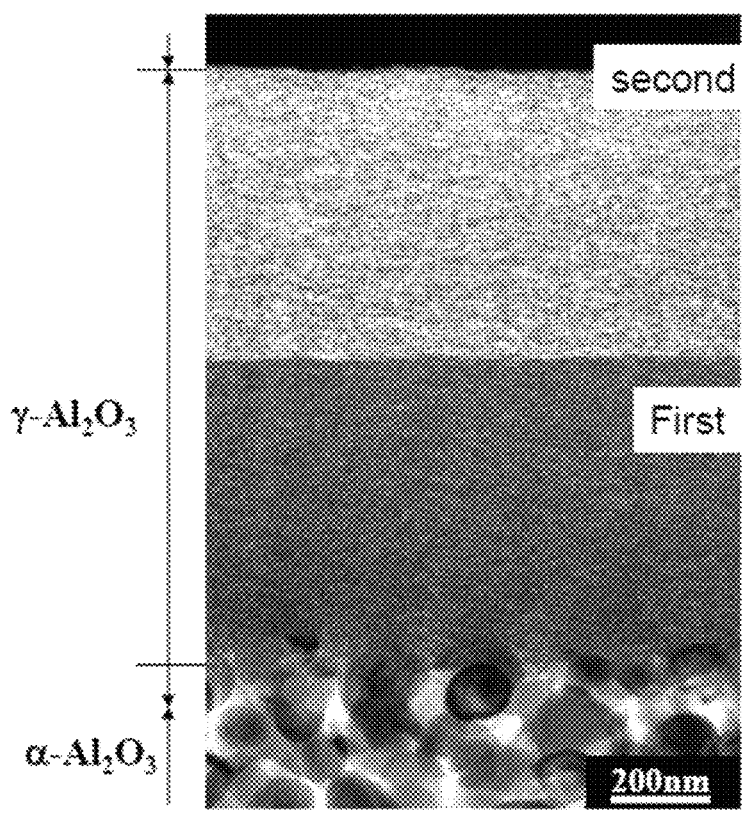
FIG. 4 is a TEM image of Si/Y (3/1) membrane cross section showing a first and a second layer of $\gamma$-$Al_2O_3$.

FIG. 3A shows a SEM photo of typical cross-section of a Y-doped silica membrane (Si/Y=3/1). A thin Y-doped silica layer effective for the selective gas permeation can be seen on a $\alpha$-$Al_2O_3$ particle-$\gamma$-$Al_2O_3$. The $\gamma$-$Al_2O_3$ (coated twice, about 2.5 µm thick) intermediate layer (FIG. 3B, covering completely the roughness (bumps) of the support surface (FIG. 3C). The thickness of this active separation layer was less than ~100 nm. obtained after 2 times dipping. The TEM micrograph indicates that the $\gamma$-$Al_2O_3$ layer has a very clear two types of layers due to two times coating of $\gamma$-$Al_2O_3$ as shown in FIG. 4. Each layer thickness was approximately 350 nm. The color difference between the two $\gamma$-$Al_2O_3$, layers was highly visible which is shown in TEM micrograph. The second layer has a lighter appearance. Since capillary forces play an important role in the layer formation, this additional layer can result in a denser second $\gamma$-$Al_2O_3$. The color difference is not caused by a difference in pore size. This was checked by permporometry in previous work, See Md. H. Zahir, S. Fujisaki, K. Sato, T. Nagano and Y. Iwamoto, Mesoporous CeO2-ZrO2-$\gamma$-Al2O3 nanocomposite membranes exhibiting remarkable hydrothermal stability. Desalination and Water Treatment, 2, 223-230 (2009), incorporated herein by reference in its entirely. The boehmite sol did not penetrate inside the macroporous $\alpha$-$Al_2O_3$ support, which might be due to the quick heat treatment process. Vos et al. also reported a TEM image of doubly coated $\gamma$-$Al_2O_3$. however, the image did not give visible difference between first layer and $\alpha$-$Al_2O_3$ support. See R. M. de Vos. H. Verweij, Improved performance of silica membranes for gas separation, journal of Membrane Science 143, 37-51 (1998), incorporated herein by reference in its entirely. The methods disclosed herein are quite effective to make a thin separation layer without any appreciable pinholes as shown in the following section.

EXAMPLE 4

Gas Permeation Properties
Dry Gases Transport Properties

FIGS. 5A and 5B shows dry gases permeance results for $SiO_2$ and Y-doped $SiO_2$ membranes as a function of temperature. The permeance data are not corrected for the support resistance since the permeance through the support is significantly higher than through the silica layer. $H_2$, $CO_2$ and $N_2$ permeance are independent of the pressure. $H_2$ and $CO_2$ permeance are slightly dependent on pressure, if a smaller pressure difference than 0.5 bar is used. This effect is found over the whole temperature range. The membranes have reproducible high permeances ($3.21 \times 10^{-7}$ mol/m²s kPa) for He and much lower permeances for $CO_2$, and $N_2$. The $SiO_2$ membranes showed a slight increase of permeance with increasing temperature for He, $H_2$, and a slight decrease for $CO_2$ and $N_2$. Typically the permeation of gases followed an activated transport flux or temperature dependency, with best helium permeation result of $3.11 \times 10^{-7}$ mol/m²s kPa for $SiO_2$ membrane. The permeance and $F_\alpha$ values obtained compare favorably with literature results. He permeance at 200° C. is $2.44 \times 10^{-7}$ mol/m²s kPa with $F\alpha > 210$ for He/$CO_2$. Previously reported values were $1.6 \times 10^{-6}$ mol/m².s.Pa and 43, respectively. The $SiO_2$ calcined at 600° C. have a $F\alpha = 154$ for $H_2$/$CO_2$ with a $H_2$ permeance of $6 \times 10^{-8}$ mol/m²s kPa at 400° C. The permselectivities for $CO_2$, $H_2$/$N_2$ and $N_2$/$O_2$ increase with increasing temperature for both $SiO_2$ and Y-doped $SiO_2$ membrane as shown in FIGS. 5A and 5B. The observed increasing permeance clearly indicates that the dominant mechanism of each gas permeance is the activated diffusion. In the case of activated diffusion, molecules permeate through micropores while being exposed to repelling forces from the pore walls, and molecules that have enough kinetic energy to overcome the repelling force can permeate the pores. The permeances of He and $H_2$ for both $SiO_2$ and Y-doped $SiO_2$ membranes show the characteristics of slightly activated permeation. while the $N_2$-permeances behaved just like the Knudsen's permeation mechanism, suggesting the $N_2$-permeation through a few pinholes still left in the membrane. The permeation of a gas molecule in a porous medium leads to decreasing permeance with increasing temperature and this mechanism called Knudsen diffusion and/or viscous flow.

The permeances of He, $H_2$, $N_2$, and $CO_2$ are $9.1 \times 10^{-7}$ mol/m²sPa, $5.8 \times 10^{-7}$ mol/m²sPa, $2.36 \times 10^{-8}$ mol/m²s kPa, and $2.32 \times 10^{-8}$ mol/m²sPa, respectively were observed for $SiO_2$ membrane al 500° C., and the permselectivity of $H_2$/$N_2$ was measured to be 26. On the other hand, the permselectivity of $H_2$/$N_2$, was measured to be 70 for Y-doped $SiO_2$ membrane. It is obvious that the permselectivities of $Y_2O_3$ doped $SiO_2$ membrane are much higher than the un-doped $SiO_2$ membrane. It means the doping of Y into the $SiO_2$ network has highly positive effect. FIG. 5B also indicates a slight increase of permeance with temperature, which can be described as an apparent thermal activation ($E_a$) of the permeance of all gases, except $CO_2$ and $N_2$. This demonstrates that $E_a$ is not necessarily always positive. The $CO_2$ permeance is nearly constant with temperature and even seems to decrease at higher temperatures. The permeance of the Y-doped $SiO_2$ membranes were in most cases independent of pressure. The Y-doped $SiO_2$ membranes had an $H_2$ permeance of $8.73 \times 10^{-8}$ mol/m²s kPa at 500° C. The smaller Y-doped $SiO_2$ permeance was observed might be due to densification of the structure and a smaller pore size.

Permeation Performance Under Wet Conditions

FIGS. 6A and 6B shows the permeation performance for $SiO_2$ and Y-doped $SiO_2$ membranes under steam atmosphere as function of time. The effect of hydrothermal treatment with a 3 vol % steam stream on the membranes at 500° C. is shown in FIGS. 6A and 6B. In the first 2 h, the permeances of He and $H_2$ decreased slightly and reached to the steady-state values of around $1.6 \times 10^{-5}$ and $4.6 \times 10^{-6}$ mol/m²s kPa, respectively for $SiO_2$ and Y-doped $SiO_2$ (FIG. 6B). After the first measurement at 0 h, the remainder of the permeance data was obtained under hydrothermal conditions. The $CO_2$ gas permeance of $SiO_2$ drastically increased, i.e., from 1.21 to $1.15 \times 10^{-9}$ mol/m²s kPa after 2 h hydrothermal treatment (a). The high permeance of $SiO_2$ might be due to the presence of pin hole and/or creaks and it was formed during the wet atmosphere for 20 h, which lead to the degradation of the resulting molecular sieve-like property.

Vos et al. investigated the hydrothermal stability of commercial $SiO_2$ membranes by $H_2$ gas permeation. They found that the $H_2$ gas permeances increased rapidly, as with hydrothermal treatment. The results indicate that the $SiO_2$ is not a good candidate for use as separation layer for gas separation membranes. The top layer must be stable under hydrothermal conditions to minimize the defects of the microporous top layer. During hydrothermal treatment for Y-doped silica membrane, two distinguishable phenomena were observed: a slight decrease in permeance for 2 h upon introduction of a stream containing steam. After the first 2 h, the permeance of Si/Y (3/1) membrane had decreased only ca. 1% for all the gases tested in the presence of steam. FIG. 6B shows that the gas permeance of Si/Y (3/1) was stable under hydrothermal conditions at 500° C. for 20 h. This can be considered a remarkable result. The $H_2$ permeance of Y-doped $SiO_2$ membranes was $6.89 \times 10^{-8}$ mol/m²s kPa with a $H_2$ /$N_2$ permeance ratio of 92, while the values observed for the $SiO_2$ membranes were $1.48 \times 10^{-7}$ mol/m²s kPa and only 7, respectively, Y-doped $SiO_2$ membranes clearly showed higher selectivity than $SiO_2$ membranes under steam conditions. No appreciable difference in the gas permeation characteristics and in the stability against steam at 500° C. was observed between the Y-doped $SiO_2$ membrane fired in steamed atmosphere at 550° C. and that at 650° C. These results suggest that the Y doping are quite effective for the prevention of further densification of amorphous Y-doped silica networks or for the membrane stability in wide temperature range.

Cannas et al. reported that the 2-3 nm nanoparticles of Y are formed by sol-gel synthesis process, strongly interacting with the $SiO_2$ matrix at the interface. The initial densification of the silica network under hydrothermal conditions probably related to a number of factors including: (i) the surface composition; (ii) the local structure and the distribution of the dispersed Si—O—Y species; (iii) the nature of the inter[31]mediate layer; and (iv) parameters related to sol preparation procedures. The real parameters for densification could be breaking down of siloxane network, generation and/or reshuffle of silanol groups, and subsequent recombination and reorganization of silanol groups into the siloxane network. The initial slight decrease of the permeance was occurred probably due to the above reasons. After 2 h hydrothermal condition the gas permeance was stable.

A possible reason to prevent the further densification of a silica network by doping Y, it was thought that the Y probably exist as metal ions or it could be tiny crystals because the observed XRD showed merely amorphous pattern and/or covalently bound compounds such as Si—O—Y, which seems fabricate a rigid network of Si—O—Y linkage under steam atmosphere and eventually the pores were not collapse and/or expand. As a result a stable permeance was observed under hydrothermal conditions. These are the main reasons for the stable permeance. Some other factors cannot be neglected for example doped Y might reduce the attack of $H_2O$ vapor and prevent thermally induced movement of silanol groups, such as alternation. It means Y doping can control the free motion of silanol groups. The large increase of $F_\alpha$ for $H_2/CO_2$ from 54 to 101 for Y-doped membrane might be due to a decrease of terminal hydroxyl groups at the internal surface of the silica and/or higher calcination temperatures lead to lower hydroxyl concentrations. A decrease of the amount of hydroxyls makes the material more hydrophobic, which may result in a lower (surface) occupation and, hence, a lower $CO_2$ permeance. Zahir et al. and Duke et al. also reported the same phenomena probably occurred for metal-doped $\gamma$-$Al_2O_3$ membranes and carbonized-template silica membranes. It is known that the silica has inadequate thermal and hydrothermal stability to enable practical application. As oxygen forms more stable bonds with transition metals than with silicon, mixed oxide networks are more stable than amorphous silicon oxide. Boffa et al. recently developed a niobia-silica mixed oxide microporous membrane that was found to be more stable under hydrothermal conditions than the silica membrane, See V. Boffa, D. H. A. Blank, J. E. ten Elshof, Hydrothermal stability of microporous silica and niobia-silica membranes, J. of Membrane Science 319, 256-263(2008), incorporated herein by reference in its entirety. This is probably the result of the incorporation of Nb ions the silica matrix, which yields hydrothermally stable Nb—O—Si bonds.

Pore Size Characterization of Unsupported Silica

The appearances of the $N_2$ adsorption/desorption isotherms of $SiO_2$ sample before (FIG. 7A) and after hydrothermal treatment (FIG. 7B) primarily suggest pore structures consisting of either solely micropores or purely mesopores; in reality, most of these samples consist of a combination of micropores and mesopores, as is evident from the PSD results obtained from the NLDFT approach. The $SiO_2$ can be classified as mostly mesoporous by virtue of the associated Type IV isotherm. Both samples exhibits similar isotherm with an H1-type hysteresis loop at P/Po=0.45 to 0.8. The corresponding curve represents a narrow pore-size distribution with an average pore radius at around 3.5 nm, which indicates the existence of a mesoporous structure. By applying the Barrett-Joyner-Halenda (BJH) method to the distribution branch of the isotherm, we obtained the pore-seize distribution of $SiO_2$ sample before (FIG. 8A) and after hydrothermally treatment (FIG. 8B). The pore-size distribution curve for both samples had one peak. The pore diameter of $SiO_2$ has been shifted to the higher value after hydrothermal treatment and a significant decrease in the pore volume was observed (FIG. 8A). In the case of Si/Y (3/1) sample, the isotherm shows type I isotherm which characteristic for microporous materials as shown in FIGS. 9A and 9B. A sharp pore size distribution with an average Kelvin radius of 2.4 nm was found for the Si/Y (3/1) sample, as shown in FIG. 10A. Most of the published results revealed that the pore size distribution of $SiO_2$ and/or $\gamma$-$Al_2O_3$ shift to the higher value after hydrothermal treatment, however, in the case of Si/Y (3/1) sample, the sharp peak shifted little bit towards lower value as shown in FIG. 10B. The pore volume was slightly decreased after hydrothermal treatment. However, the pore size distribution was almost unchanged after hydrothermal treatment for Si/Y (3/1).

Figure 11:
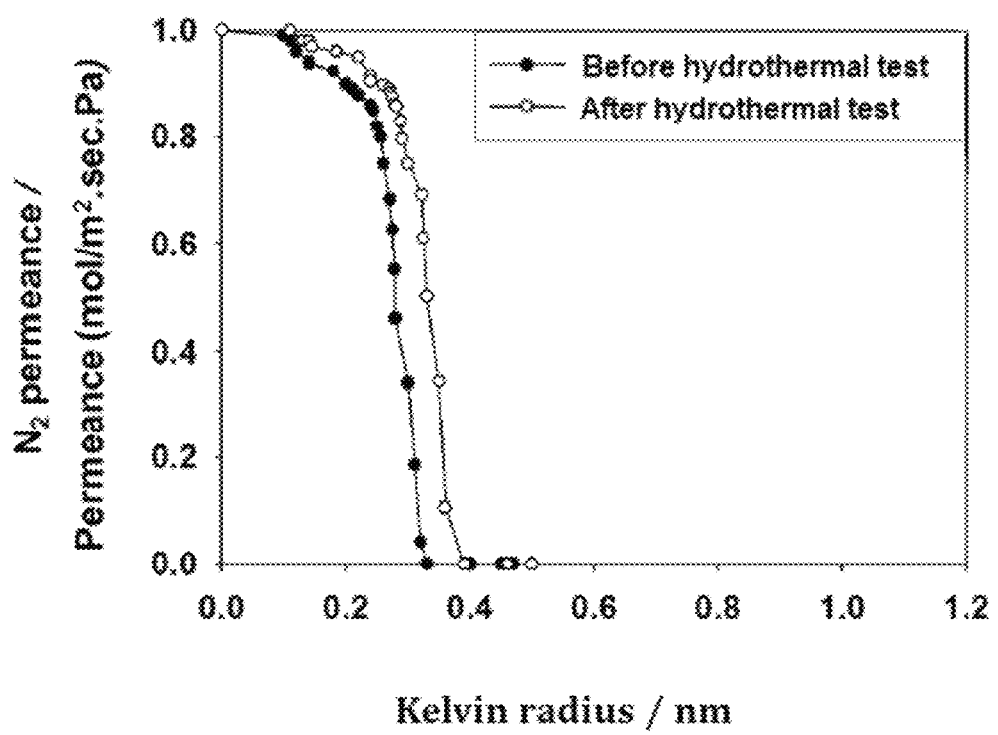
FIG. 11 shows $N_2$ permeance (measured by nano-permporometer) as a function of Kelvin radius of Si/Y (3/1) membranes before (●) and after (○) hydrothermal treatment for 4 h.
Figure 12:
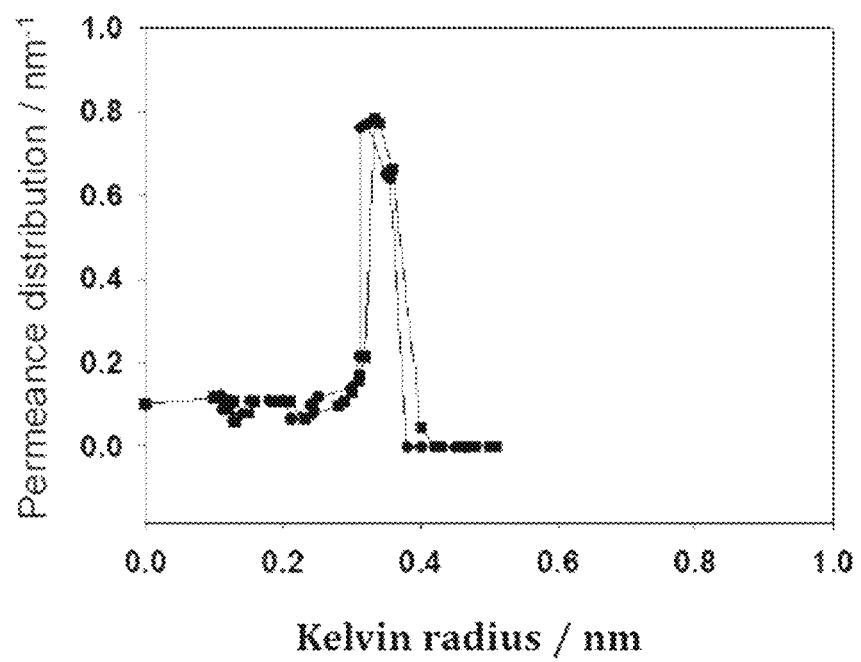
FIG. 12 shows pore size distribution measured by nano-permporometer of Si/Y (3/1) membranes before (●) and after (○) hydrothermal treatment for 4 h.

It should be mentioned though that the results for unsupported material (powder samples) cannot be transferred quantitatively to the supported membrane situation. They can only be of qualitative use to show trends in changes in pore structure with processing. It must be clear that the supported $SiO_2$ layer cannot be expected to have the same structure as similar processed unsupported $SiO_2$ material, since the forces present during the drying process of both materials are different. The $N_2$ permeation and the calculated pore size distribution (PSD), obtained by permporometry, for a supported as-prepared microporous Si/Y (3/1) membrane are shown in FIG. 11 and FIG. 12. The calculated PSDs show the distribution of the total number of pores within a certain range. It can be seen that the permeation at large Kelvin radii was almost zero, and that a strongly increased permeation was observed at around 0.2-0.3 nm. This implies that no pores or only a few pores were present with Kelvin radii larger than 0.4 nm. The PSD of the Si/Y (3/1) membrane was found to be almost unchanged even after the 20 h exposure at 500° C. as shown in FIG. 12. To the best of our knowledge, no permporometry measurement has yet been performed on Y doped $SiO_2$ based composite-supported membranes after hydrothermal treatment.

Yttria-doped silica membrane synthesized using tetraethyl orthosilicate-derived sol mixed with yttrium nitrate hexahydrate. Subsequently, these solutions were used in the preparation of hydrogen separation microporous membranes with enhanced hydrothermal stability at 500° C. under a steam pressure of 150 kPa. Very high permeance obtained for $N_2$ and $O_2$ of 2.2 and $5 \times 10^{-8}$ mol/m²s kPa, respectively, offer perspectives on dedicated air purification and/or separation in which larger impurity molecules are blocked by molecular sieving effects. Y-doped $SiO_2$ hydrogen separation membranes showed improved hydrothermal stability and high selectivity, compared with $SiO_2$ membranes.

The invention claimed is:

1. A gas separation device, comprising:
   a permeance cell having an upstream feed end and a downstream permeate end, and a nanocomposite membrane between the upstream feed end and the downstream permeate end of the permeance cell,
   wherein the nanocomposite membrane is configured to separate a first gas having high permeance through the nanocomposite membrane from a second gas having low permeance through the nanocomposite membrane;
   wherein the nanocomposite membrane comprises:
      a tubular $\alpha$-$Al_2O_3$ membrane support;
      an intermediate layer comprising $\gamma$-$Al_2O_3$, wherein the intermediate layer is 300-1200 nm thick and coats a surface of the tubular $\alpha$-$Al_2O_3$ membrane support;
      a nanocomposite layer comprising $SiO_2$ and $Y_2O_3$, wherein the nanocomposite layer is 25-150 nm thick and coats a surface of the intermediate layer;
      wherein the nanocomposite layer is porous with an average largest radius micropore 0.2-0.6 nm.

2. The gas separation device of claim 1, wherein the intermediate layer comprises at least two distinct $\gamma$-$Al_2O_3$ layers, each distinct $\gamma$-$Al_2O_3$ layer being 150-600 nm thick.

3. The gas separation device of claim 1, wherein the $Y_2O_3$ the form of nanoparticles with a largest dimension of 1-6 nm, the nanocomposite layer is in the form of a $SiO_2$ matrix, and the $Y_2O_3$ nanoparticles are dispersed in or deposited onto the $SiO_2$ matrix.

4. The gas separation device of claim 3, wherein the nanocomposite layer is porous with an average mesopore radius of 1-4 nm.

5. The gas separation device of claim 1, wherein the molar ratio of Si:Y in the nanocomposite membrane is 1:1 to 5:1.

6. The gas separation device of claim 1, wherein the nanocomposite membrane has a membrane permeance of $1e^{-8}$-$1e^{-6}$ mol/m²·sec·Pa for the first gas, and a membrane permeance of $1e^{-10}$-$1e^{-9}$ mol/m²·sec·Pa for the second gas when a mixture of gas comprising the first gas and the second gas is fed through the permeance cell at a temperature of 100-650° C.

7. The gas separation device of claim 6, wherein the first gas is $H_2$, He, or both, and the second gas is $N_2$, $CO_2$, or both.

8. The gas separation device of claim 1, wherein the nanocomposite membrane has a membrane permeance of $1e^{-8}$-$1e^{-6}$ mol/m²·sec·Pa for the first gas, and a membrane permeance of $1e^{-10}$-$1e^{-9}$ mol/m²·sec·Pa for the second gas when a mixture of gas comprising the first gas, the second gas, and up to 5 wt % of steam relative to the total weight of the mixture of gas is fed through the nanocomposite membrane.

9. A method of separating a mixture of gas comprising a first gas and a second gas, comprising:
   introducing the mixture of gas into the upstream feed end of the permeance cell of the gas separation device of claim 1, wherein the nanocomposite layer of the nanocomposite membrane faces toward the upstream feed end and forms a permeable barrier between the upstream feed end and the downstream permeate end;
   applying a vacuum to the downstream permeate end; and
   separating the first gas from the second gas by allowing the first gas to pass through the nanocomposite membrane and to the downstream permeate end, and prohibiting the second gas from passing through the nanocomposite membrane.

10. The method of claim 9, wherein the first gas is $H_2$, He, or both, and the second gas is $N_2$, $CO_2$, or both.

* * * * *